US012368541B2

(12) United States Patent
Dimou et al.

(10) Patent No.: US 12,368,541 B2
(45) Date of Patent: Jul. 22, 2025

(54) TECHNIQUES FOR RETRANSMISSION WITH COMPONENT CARRIER SWITCHING CONFIGURATION

(71) Applicant: QUALCOMM Incorporated, San Diego, CA (US)

(72) Inventors: Konstantinos Dimou, New York City, NY (US); Yan Zhou, San Diego, CA (US); Peter Gaal, San Diego, CA (US); Tao Luo, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 18/051,154

(22) Filed: Oct. 31, 2022

(65) Prior Publication Data

US 2023/0143953 A1    May 11, 2023

Related U.S. Application Data

(60) Provisional application No. 63/276,375, filed on Nov. 5, 2021.

(51) Int. Cl.
*H04L 1/1867* (2023.01)
*H04L 1/1812* (2023.01)
*H04L 5/00* (2006.01)

(52) U.S. Cl.
CPC .......... *H04L 1/1893* (2013.01); *H04L 5/0098* (2013.01)

(58) Field of Classification Search
CPC .... H04L 1/1893; H04L 1/1812; H04L 5/0098
See application file for complete search history.

(56) References Cited

U.S. PATENT DOCUMENTS

| 2023/0180223 A1* | 6/2023 | Tseng | H04W 56/001 |
| | | | 370/329 |
| 2024/0236986 A1* | 7/2024 | Bae | H04L 1/1861 |

OTHER PUBLICATIONS

International Search Report and Written Opinion—PCT/US2022/079041—ISA/EPO—Feb. 23, 2023.

(Continued)

*Primary Examiner* — Kent Krueger
(74) *Attorney, Agent, or Firm* — Arent Fox, LLP

(57) ABSTRACT

Aspects described herein relate to receiving, from a base station, a hybrid automatic repeat request (HARQ) retransmission request including a HARQ retransmission offset value indicating a slot of an uplink transmission to be retransmitted, wherein the HARQ retransmission offset value indicates, based at least in part on whether switching component carriers (CCs) is permitted, the slot according to either a first numerology of a first CC or a second numerology of a second CC, and transmitting, to the base station based on the HARQ retransmission offset value, a retransmission of the uplink transmission in the slot.

30 Claims, 11 Drawing Sheets

(56) References Cited

OTHER PUBLICATIONS

NEC: "UE Feedback Enhancements for HARQ-ACK", 3GPP TSG RAN WG1 #106bis-e, R1-2109131, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, 12 Pages, Oct. 1, 2021, XP052058091, p. 5, 6, 7.

Qualcomm Incorporated: "HARQ-ACK Enhancement for IOT and URLLC", 3GPP TSG RAN WG1 #106bis-e, R1-2110178, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, XP052059114. 36 Pages, Section 2.3, Section 3.5, Figures 3, 7, pp. 27, 33.

\* cited by examiner

TECHNIQUES FOR RETRANSMISSION WITH COMPONENT CARRIER SWITCHING CONFIGURATION

CLAIM OF PRIORITY UNDER 35 U.S.C. § 119

The present Application for patent claims priority to Provisional Patent Application No. 63/276,375, entitled "TECHNIQUES FOR RETRANSMISSION WITH COMPONENT CARRIER SWITCHING CONFIGURATION" filed Nov. 5, 2021, which is assigned to the assignee hereof and hereby expressly incorporated by reference herein for all purposes.

BACKGROUND

Aspects of the present disclosure relate generally to wireless communication systems, and more particularly, to retransmitting communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, hybrid automatic repeat request (HARQ) retransmissions are defined where a user equipment (UE) can be instructed to retransmit communications that may not have been received by a base station. In addition, in 5G NR, component carrier (CC) switching can be configured in some examples where the UE can switch communications from a first CC to a second CC.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication at a user equipment (UE) is provided that includes receiving, from a base station, a hybrid automatic repeat request (HARQ) retransmission request including a HARQ retransmission offset value indicating a slot of an uplink transmission to be retransmitted, wherein the HARQ retransmission offset value indicates, based at least in part on whether switching component carriers (CCs) is permitted, the slot according to either a first numerology of a first CC or a second numerology of a second CC, and transmitting, to the base station based on the HARQ retransmission offset value, a retransmission of the uplink transmission in the slot.

In another aspect, a method for wireless communication at a base station is provided that includes transmitting, to a UE, a HARQ retransmission request including a HARQ retransmission offset value indicating a slot of an uplink transmission to be retransmitted, wherein the HARQ retransmission offset value indicates, based at least in part on whether switching CCs is permitted, the slot according to either a first numerology of a first CC or a second numerology of a second CC, and receiving, from the UE based on the HARQ retransmission request, a retransmission of the uplink transmission in the slot.

According to an aspect, an apparatus for wireless communication is provided that includes a processor, memory coupled with the processor, and instructions stored in the memory. The instructions are operable, when executed by the processor, to cause the apparatus to receive, from a base station, a HARQ retransmission request including a HARQ retransmission offset value indicating a slot of an uplink transmission to be retransmitted, wherein the HARQ retransmission offset value indicates, based at least in part on whether switching CCs is permitted, the slot according to either a first numerology of a first CC or a second numerology of a second CC, and transmit, to the base station based on the HARQ retransmission offset value, a retransmission of the uplink transmission in the slot.

In another aspect, an apparatus for wireless communication is provided that includes a processor, memory coupled with the processor, and instructions stored in the memory. The instructions are operable, when executed by the processor, to cause the apparatus to transmit, to a UE, a HARQ retransmission request including a HARQ retransmission offset value indicating a slot of an uplink transmission to be retransmitted, wherein the HARQ retransmission offset value indicates, based at least in part on whether switching CCs is permitted, the slot according to either a first numerology of a first CC or a second numerology of a second CC, and receive, from the UE based on the HARQ retransmission request, a retransmission of the uplink transmission in the slot.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
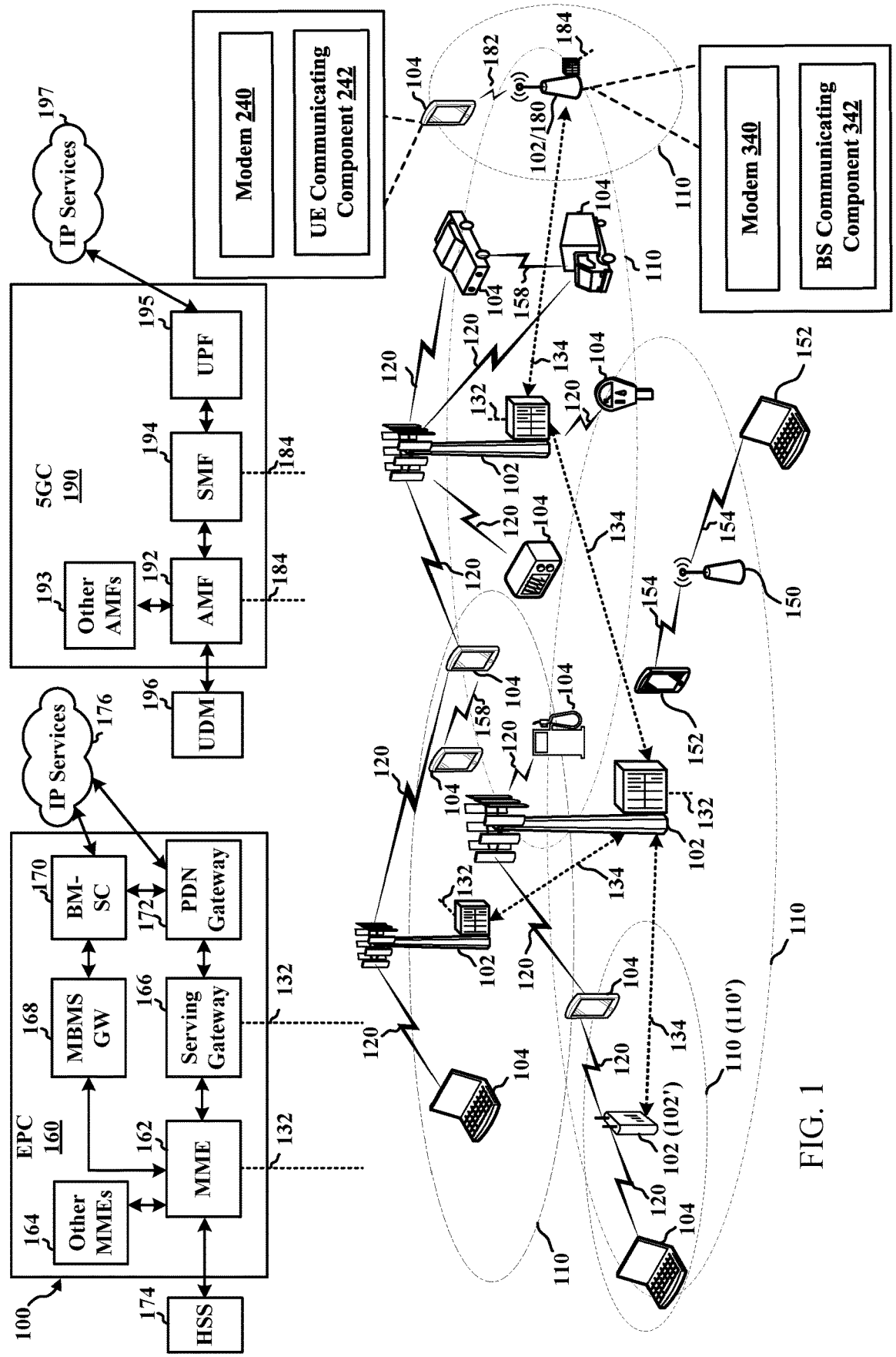
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to performing retransmissions with component carrier (CC) switching. In some wireless communication technologies, such as fifth generation (5G) new radio (NR), a user equipment (UE) can be configured and/or instructed to perform hybrid automatic repeat request (HARQ) retransmissions of uplink transmissions that may not have been received by a base station. In another example, the UE can be configured to perform CC switching. It is possible, however, that when CC switching is performed during a HARQ retransmission process, that a slot over which the HARQ retransmission is to be transmitted may be different on the second CC due to the second CC having a different numerology than the first CC, a different slot format than the first CC, etc.

For example, in 5G NR, physical uplink control channel (PUCCH) CC switching can be based on dynamic indication in downlink control information (DCI) scheduling a PUCCH and/or semi-static configuration (e.g., via radio resource control (RRC) signaling). In an example, dynamic indication and/or semi-static configuration can be subject to separate UE capabilities. The semi-static PUCCH carrier switching configuration operation can be based on RRC configured PUCCH cell timing pattern of applicable PUCCH cells and can support PUCCH carrier switching across cells with different numerologies. In an example, for semi-static PUCCH cell switching, a reference cell may include one or more of a primary cell in a master cell group (PCell), a primary cell in a secondary cell group (PSCell), or a secondary cell that is capable of receiving PUCCH (PUCCH-SCell). The time domain pattern configurations can be based on the numerology of the reference cell. The physical downlink shared channel (PDSCH) to HARQ-acknowledgement (ACK) offset k1 can be interpreted based on the numerology and PUCCH configuration of a reference cell to be able to apply the time-domain PUCCH cell switching pattern.

In some wireless communication technologies, a time division may include a transmission time interval (TTI), which may be or include a slot including a number of symbols (e.g., orthogonal frequency division multiplexing (OFDM) symbols, single carrier-frequency division multiplexing (SC-FDM) symbols, etc.), a sub-slot that is a portion of a slot (e.g., one or more consecutive or non-consecutive symbols of the slot, which may or may not include all symbols in the slot), etc. The term "slot" used herein can refer to a slot or a sub-slot. In 5G NR, a one-shot HARQ retransmission can be defined on PUCCH, where a triggering DCI can dynamically indicate a HARQ retransmission offset value, referred to as "HARQ_retx_offset," which can be used to define the offset in number of PUCCH slots/sub-slots between the triggering DCI and the PUCCH slot/sub-slot of the HARQ-ACK codebook to be retransmitted. For example, for the triggering DCI received in slot/sub-slot m, indicating the HARQ-ACK retransmission in slot/sub-slot m+k, and indicating HARQ_retx_offset, the PUCCH slot/sub-slot n of the HARQ-ACK codebook to be retransmitted can be determined (e.g., by a UE and/or base station) as either n=m-HARQ_retx_offset, in a first example (referred to herein as Alt 1 for HARQ_retx_offset), or n=m+k-HARQ_retx_offset, in a second example (referred to herein as Alt 2 for HARQ_retx_offset). Thus, depending on how n is to be determined, HARQ_retx_offset may indicate a different value in each example to refer to the same slot/sub-slot to be retransmitted.

It is possible, in some examples, CC switching can occur, or may be possible, during a HARQ retransmission procedure. For example, a UE can receive a HARQ retransmission request from a base station, and may also receive a CC switching command from the base station before the retransmitting the HARQ-ACK codebook (e.g., the uplink transmission) to be retransmitted. For example, the UE can communicate with the base station over a first CC and may be commanded to switch to a second CC, where the CCs can have different numerologies. In this regard, for example, the slot formats for the CCs may not align. Aspects described herein relate to various mechanisms to handle this scenario. In one example, the UE and/or base station can interpret the HARQ retransmission offset value, which can be received in the triggering DCI from a PCell (or other reference cell), according to a first numerology of the first CC. In another example, the UE and/or base station can interpret the HARQ retransmission offset value according to the second numerology of the second CC. Other aspects described herein relate to defining or determining whether joint configuration of triggered HARQ retransmission and CC switching (at least for PUCCH) is or is not allowed, which may avoid such scenarios in the first place.

In an example, determining which numerology to use and/or coordinating the determination among the UE and the base station can allow the UE and base station to properly process HARQ retransmission requests having CC switching possibly occurring during the HARQ retransmission process. In addition, not allowing joint configuration of triggering of HARQ retransmission and CC switching may avoid the scenario such that the UE and base station need not determine how to handle the scenario. In either example, the UE and the base station can more accurately utilize the HARQ retransmission offset value to determine which uplink transmission is to be retransmitted. This can improve the quality of communications be enabling and/or improving the retransmission, conserve communication resources, and accordingly improve user experience when using the UE.

The described features will be presented in more detail below with reference to FIGS. 1-11.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for performing retransmission where CC switching is possible, in accordance with aspects described herein. In addition, some nodes may have a modem 340 and BS communicating component 342 for receiving uplink retransmissions from a UE where CC switching is possible, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can retransmit uplink transmissions according to a HARQ retransmission offset value where CC switching may be possible. In one example, UE communicating component 242 can retransmit the uplink transmissions based on whether CC switching can be jointly configured with the HARQ retransmission. If not, for example, UE communicating component 242 can retransmit an uplink transmission based on a numerology of a CC on which the retransmission (and initial uplink transmission to be retransmitted) occur. In another example, where CC switching can be jointly configured with the HARQ retransmission, if a command to switch CCs is received during the HARQ retransmission procedure, UE communicating component 242 can interpret the HARQ retransmission offset value based on either a first numerology of a first CC from which the UE switches to a second CC, or a second numerology of the second CC.

Figure 2:
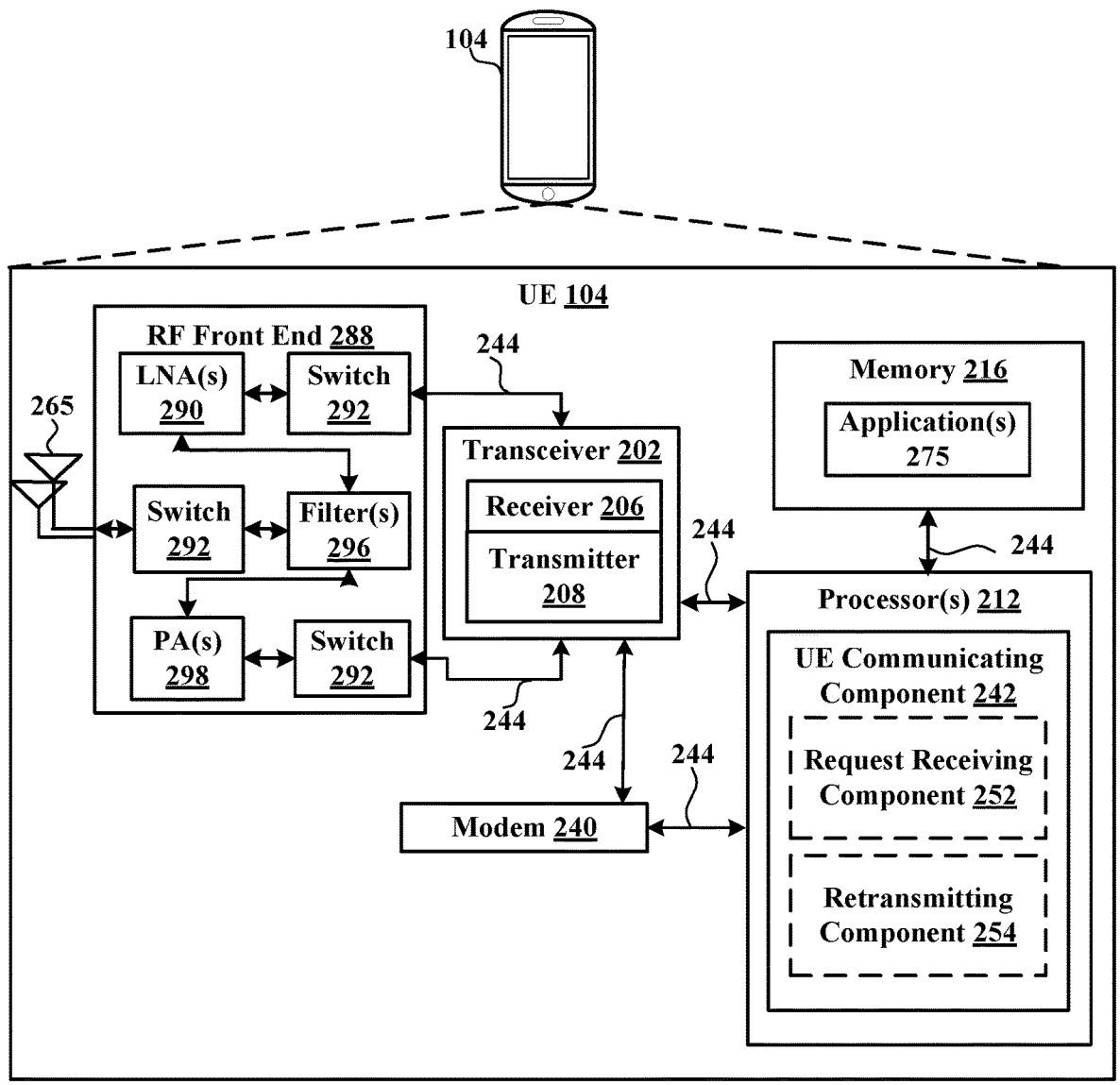
FIG. 2 is a block diagram illustrating an example of a user equipment (UE), in accordance with various aspects of the present disclosure.
Figure 3:
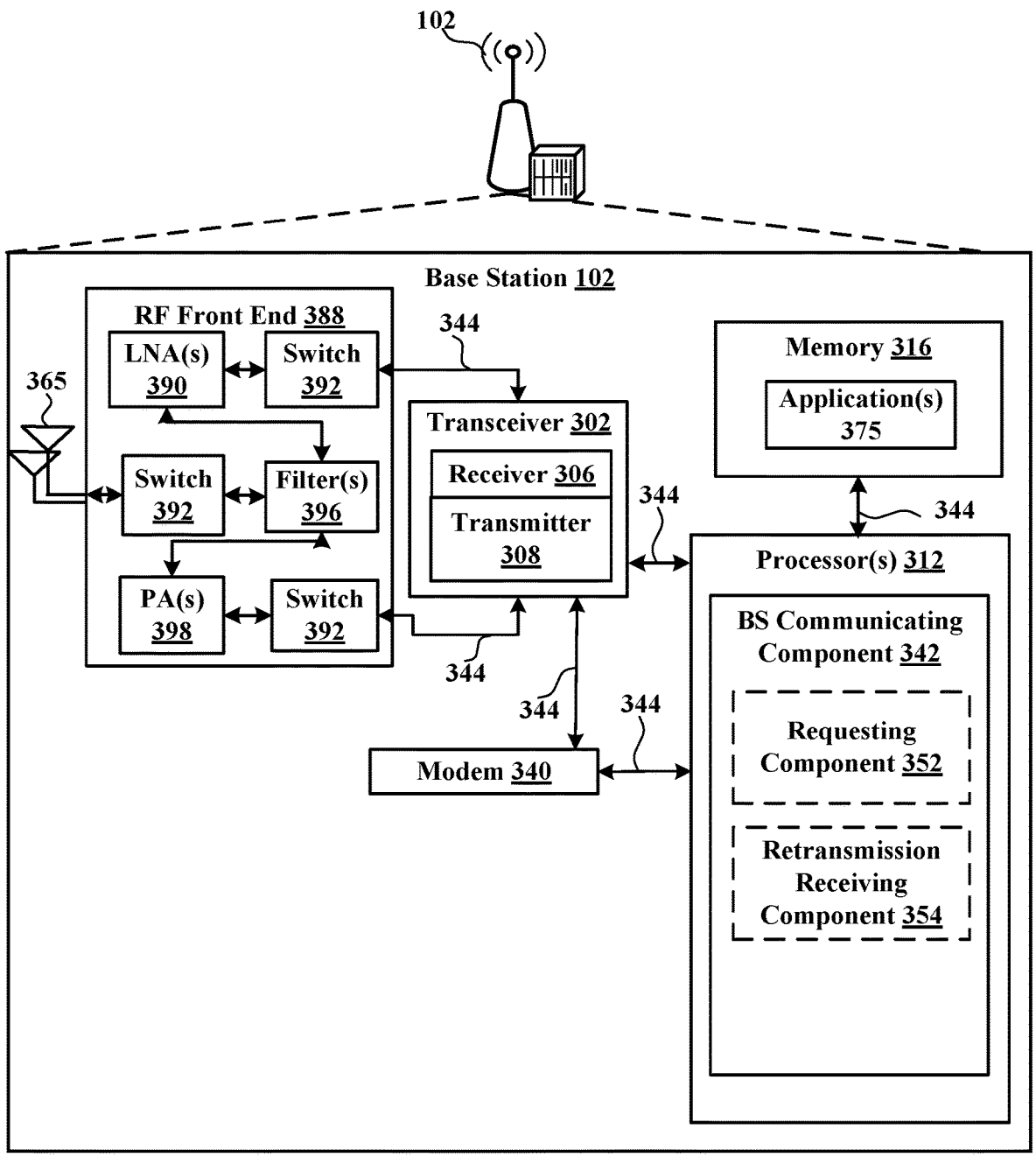
FIG. 3 is a block diagram illustrating an example of a base station, in accordance with various aspects of the present disclosure.
Figure 4:
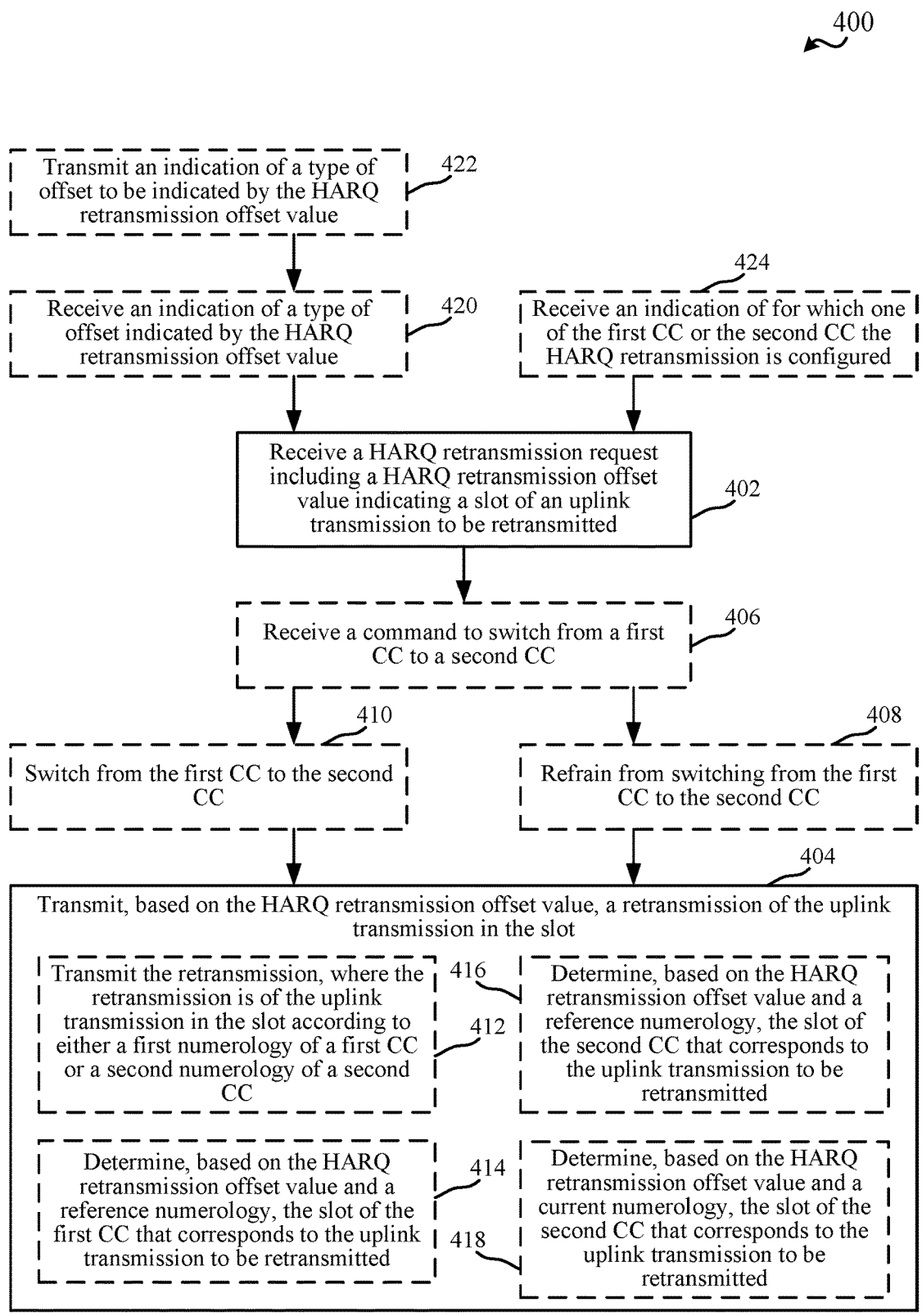
FIG. 4 is a flow chart illustrating an example of a method for performing retransmission where CC switching is possible, in accordance with aspects described herein.
Figure 5:
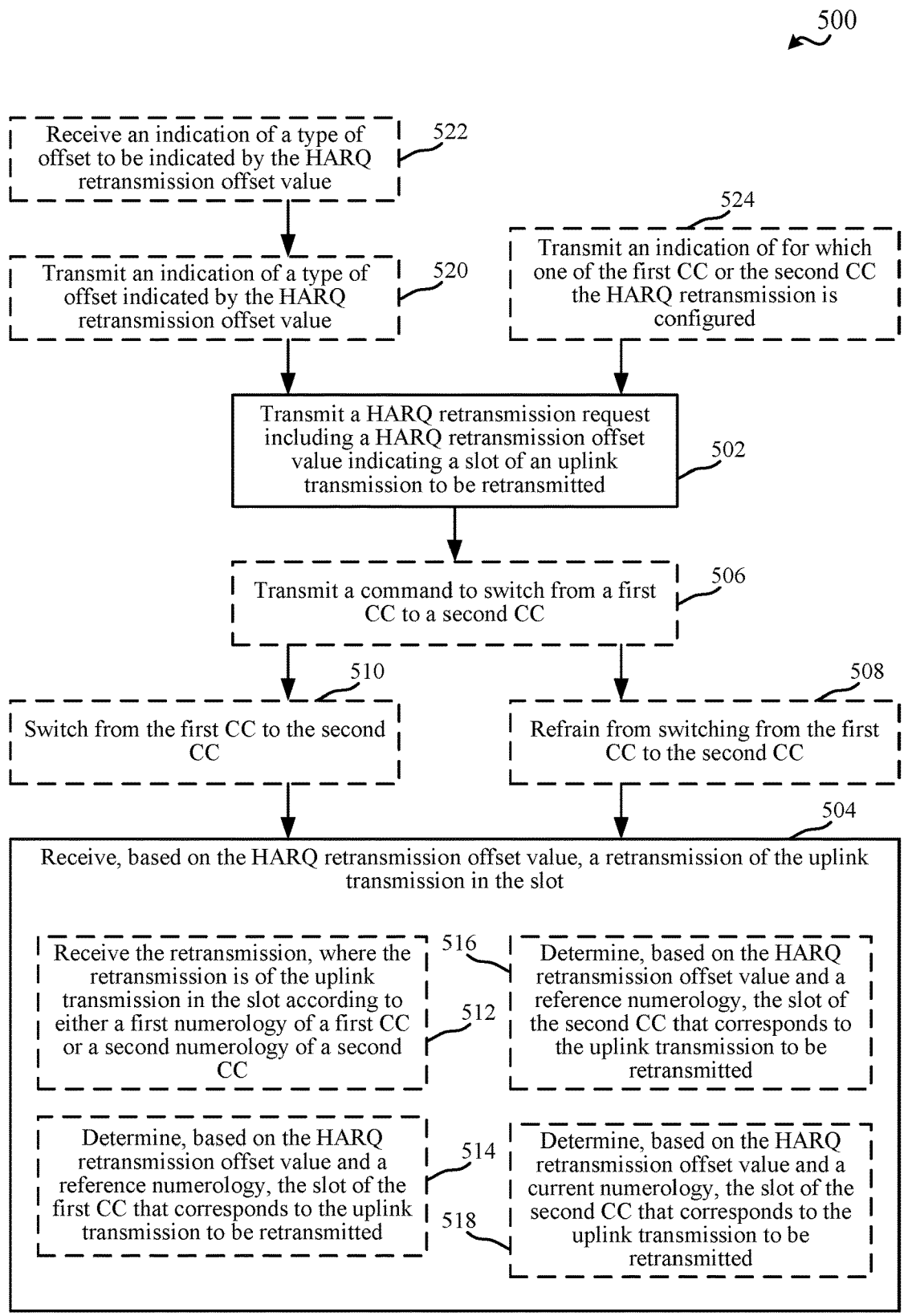
FIG. 5 is a flow chart illustrating an example of a method for receiving retransmission where CC switching is possible, in accordance with aspects described herein.

Turning now to FIGS. 2-11, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for performing retransmission where CC switching is possible, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a request receiving component 252 for receiving a HARQ retransmission request and/or a CC switching command (or request), and a retransmitting component 254 for performing HARQ retransmission according to a HARQ retransmission offset interpreted based on a certain numerology of a certain CC, in accordance with aspects described herein.

In an aspect, the processor(s) 212 may correspond to one or more of the processors described in connection with the UE in FIG. 11. Similarly, the memory 216 may correspond to the memory described in connection with the UE in FIG. 11.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for receiving uplink retransmissions from a UE where CC switching is possible, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a requesting component 352 for requesting a UE to perform a HARQ retransmission and/or CC switching, and/or a retransmission receiving component 354 for receiving, from the UE, the HARQ retransmission according to a HARQ retransmission offset interpreted based on a certain numerology of a certain CC, in accordance with aspects described herein.

In an aspect, the processor(s) 312 may correspond to one or more of the processors described in connection with the base station in FIG. 11. Similarly, the memory 316 may correspond to the memory described in connection with the base station in FIG. 11.

FIG. 4 illustrates a flow chart of an example of a method 400 for performing retransmission where CC switching is possible, in accordance with aspects described herein. FIG. 5 illustrates a flow chart of an example of a method 500 for receiving retransmissions where CC switching is possible, in accordance with aspects described herein. In an example, a UE 104 can perform the functions described in method 400 using one or more of the components described in FIGS. 1 and 2. In an example, a base station 102 can perform the functions described in method 500 using one or more of the components described in FIGS. 1 and 3. Though the methods 400 and 500 are described in conjunction with one another for ease of explanation, the methods 400 and 500 are not required to be performed in conjunction with one another, and different nodes can independently perform each of the methods 400 or 500.

In method 400, at Block 402, a HARQ retransmission request including a HARQ retransmission offset value indicating a slot of an uplink transmission to be retransmitted can be received. In an aspect, request receiving component 252, e.g., in conjunction with processor(s) 212, memory 216, transceiver 202, UE communicating component 242, etc., can receive (e.g., in DCI from a base station 102) the HARQ retransmission request including the HARQ retransmission offset value indicating the slot of the uplink transmission to be retransmitted. In an example, the HARQ retransmission offset value may indicate an offset of a number of slots from a current slot within which the HARQ retransmission request is received to the slot that corresponds to the uplink transmission. In another example, the HARQ retransmission offset value may indicate an offset of a number of slots from an uplink slot indicated for transmitting the HARQ retransmission to the slot that corresponds to the uplink transmission. For example, the DCI can indicate a k1 offset value for HARQ retransmissions, and the uplink slot indicated for transmitting the HARQ retransmission can be indicated or determined based on the k1 offset value indicated for HARQ retransmissions, as measured from the slot during which the HARQ retransmission request is received. As more specifically described above, the HARQ retransmission offset value can be indicated such that either n=m-HARQ_retx_offset, in a first example, or n=m+k-HARQ_retx_offset, in a second example, where n is the slot of the uplink transmission to be retransmitted.

In method 500, at Block 502, a HARQ retransmission request including a HARQ retransmission offset value indicating a slot of an uplink transmission to be retransmitted can be transmitted. In an aspect, requesting component 352, e.g., in conjunction with processor(s) 312, memory 316, transceiver 302, BS communicating component 342, etc., can transmit the HARQ retransmission request including the HARQ retransmission offset value indicating the slot of the uplink transmission to be retransmitted. For example, requesting component 352 can transmit the request for HARQ retransmission to the UE 104 in DCI (e.g., on a physical downlink control channel (PDCCH), physical downlink shared channel (PDSCH), etc.). In an example, requesting component 352 can transmit the retransmission request based on determining that the uplink transmission, as scheduled, was not received from the UE 104 or was not properly decoded at the base station 102. In an example, requesting component 352 can include the HARQ retransmission offset value in the HARQ retransmission request, which may be one of the HARQ retransmission offset values described above and may be expected to be interpreted using a certain numerology of a certain CC based on possible CC switching, as described further herein.

In method 400, at Block 404, a retransmission of the uplink transmission in the slot can be transmitted based on the HARQ retransmission offset value. In an aspect, retransmitting component 254, e.g., in conjunction with processor(s) 212, memory 216, transceiver 202, UE communicating component 242, etc., can transmit, based on the HARQ retransmission offset value, the retransmission of the uplink transmission in the slot, e.g., where the retransmission can be transmitted in a subsequent slot that may be indicated or determined based on the HARQ retransmission request (e.g., as a k1 value offset from the HARQ retransmission request). For example, retransmitting component 254 can determine the uplink transmission to be retransmitted based on the HARQ retransmission offset value, which can be interpreted based on a numerology of a first CC over which the UE 104 communicates with the base station 102 or a second CC that may or may not be switched to in CC switching during the HARQ retransmission procedure (e.g., where the CC switching may occur between the time when the uplink transmission is initially transmitted and the time when the uplink transmission is retransmitted).

In method 500, at Block 504, a retransmission of the uplink transmission in the slot can be received based on the HARQ retransmission offset value. In an aspect, retransmission receiving component 354, e.g., in conjunction with processor(s) 312, memory 316, transceiver 302, BS communicating component 342, etc., can receive, based on the HARQ retransmission offset value, the retransmission of the uplink transmission in the slot, e.g., where the retransmission can be received in a subsequent slot that may be indicated or determined based on the HARQ retransmission request (e.g., as a k1 value offset from the HARQ retransmission request). For example, retransmission receiving component 354 can determine the uplink transmission to be retransmitted based on the HARQ retransmission offset value, which can be interpreted based on a numerology of a first CC over which the UE 104 communicates with the base station 102 or a second CC that may or may not be switched to in CC switching during the HARQ retransmission procedure (e.g., where the CC switching may occur between the time when the uplink transmission is initially transmitted and the time when the uplink transmission is retransmitted).

In one example, retransmitting component 254 and/or retransmission receiving component 354 can interpret the HARQ retransmission offset value based on a numerology of a CC having a highest SCS (e.g., a lowest slot duration), which can result in a higher granularity and may not require a slot indication, as explained in further detail herein. In another example, retransmitting component 254 and/or retransmission receiving component 354 can interpret the HARQ retransmission offset value based on a numerology of a CC having a lowest (or highest) CC index among the configured CCs (e.g., CC0 or CC1 in the examples described below).

In method 400, optionally at Block 406, a command to switch from a first CC to a second CC can be received. In an aspect, request receiving component 252, e.g., in conjunction with processor(s) 212, memory 216, transceiver 202, UE communicating component 242, etc., can receive the command to switch from the first CC to the second CC. In an example, request receiving component 252 can receive the command to switch from the first CC to the second CC between the time when the uplink transmission is initially transmitted and the time when the uplink transmission is retransmitted.

In method 500, optionally at Block 506, a command to switch from a first CC to a second CC can be transmitted. In an aspect, requesting component 352, e.g., in conjunction with processor(s) 312, memory 316, transceiver 302, BS communicating component 342, etc., can transmit the command to switch from the first CC to the second CC. In an example, requesting component 352 can transmit the command to switch from the first CC to the second CC between the time when the uplink transmission is initially transmitted and the time when the uplink transmission is retransmitted.

In one specific example, joint configuration of HARQ retransmission requests and CC switching, whether the CC switching is configured semi-statically (e.g., in RRC signaling) or dynamically (e.g., via DCI), may not be permitted. In another example, joint configuration of HARQ retransmission requests and CC switching, whether the CC switching is configured semi-statically (e.g., in RRC signaling) or dynamically (e.g., via DCI), may be permitted, but CC switching during a retransmission (e.g., before the retransmission but after the uplink transmission being retransmitted) may not be allowed. In this example, in method 400, at Block 408, switching from the first CC to the second CC can be refrained from. In an aspect, UE communicating component 242, e.g., in conjunction with processor(s) 212, memory 216, transceiver 202, etc., can refrain from switching from the first CC to the second CC. This can be based on joint configuration of HARQ retransmission requests and CC switching not being permitted, in one example, or in another example, can be based on joint configuration of HARQ retransmission requests and CC switching being permitted, but CC switching during HARQ retransmission not being allowed.

In another example, joint configuration of HARQ retransmission requests and semi-static CC switching may not be permitted, while joint configuration of HARQ retransmission requests and dynamic CC switching may be permitted. In this example, UE communicating component 242 can refrain from switching from the first CC to the second CC, though a command is received, where the command is received in a semi-static CC switching configuration during the HARQ retransmission process. Similarly, in another example, joint configuration of HARQ retransmission requests and CC switching may be permitted, while semi-static CC switching may not be allowed during HARQ retransmission requests while dynamic CC switching may be allowed. Similarly, in this example, UE communicating component 242 can refrain from switching from the first CC to the second CC, though a command is received, where the command is received in a semi-static CC switching configuration during the HARQ retransmission process.

In any case, where joint configuration of HARQ retransmission requests and CC switching is not permitted, or is permitted but actual CC switching is not allowed during retransmission, retransmitting component 254 can transmit the retransmission based on the HARQ retransmission offset value being interpreted according to the reference numerology of the CC on which the HARQ retransmission request is received. Examples are shown in FIGS. 6 and 7.

Figure 6:
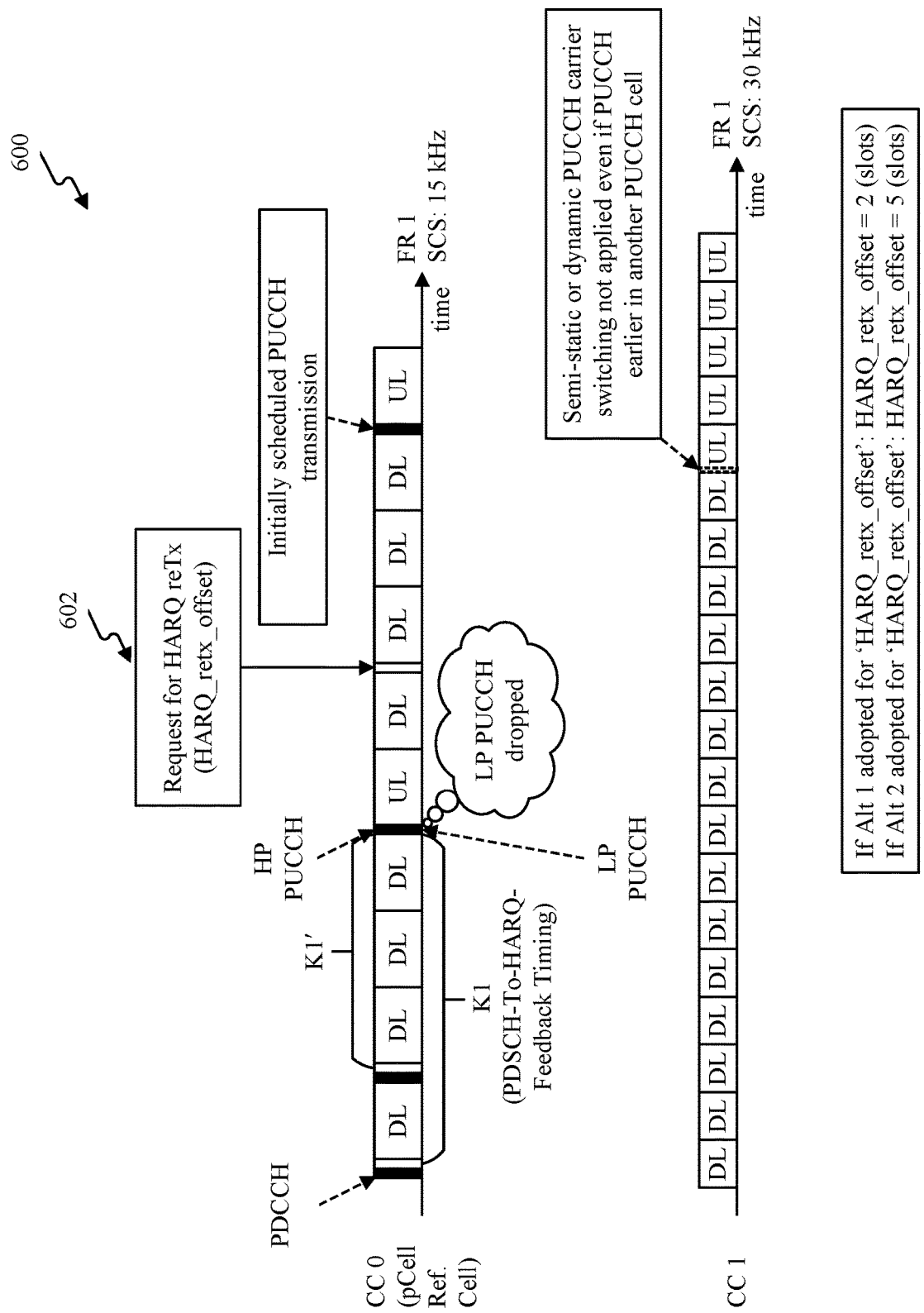
FIG. 6 illustrates an example of a timeline for uplink retransmissions where joint configuration of retransmission and CC switching is not permitted, or where joint configuration is permitted, but CC switching is not allowed during retransmission, in accordance with aspects described herein.

FIG. 6 illustrates an example of a timeline 600 for uplink retransmissions where joint configuration of retransmission and CC switching is not permitted, or where joint configuration is permitted, but CC switching is not allowed during retransmission. Timeline 600 includes multiple CCs (CC0, CC1), each having a slot format of downlink and uplink slots. For example, one or more downlink slots can include one or more PDCCH symbols and/or the remaining symbols as PDSCH symbols. Similarly, for example, one or more uplink slots can include one or more PUCCH symbols and/or the remaining symbols as PUSCH symbols. In timeline 600, when HARQ retransmission request 602 is received, the HARQ retransmission offset value in the request can be interpreted based on the numerology of the CC over which the HARQ retransmission request 602 is transmitted (e.g., CC0). Specifically, in this example, if the HARQ retransmission offset value is indicated as an offset of a number of slots from a current slot within which the HARQ retransmission request is received to the slot that corresponds to the uplink transmission, the HARQ retransmission offset value can be 2 slots on CC0. In another example, if the HARQ retransmission offset value is indicated as an offset of a number of slots from an uplink slot indicated for transmitting the HARQ retransmission to the slot that corresponds to the uplink transmission, the HARQ retransmission offset value can be 5 slots on CC0. In this example, the numerology of CC1 need not be considered in computing the slot for the HARQ retransmission, as CC switching is not allowed during the HARQ retransmission procedure.

Figure 7:
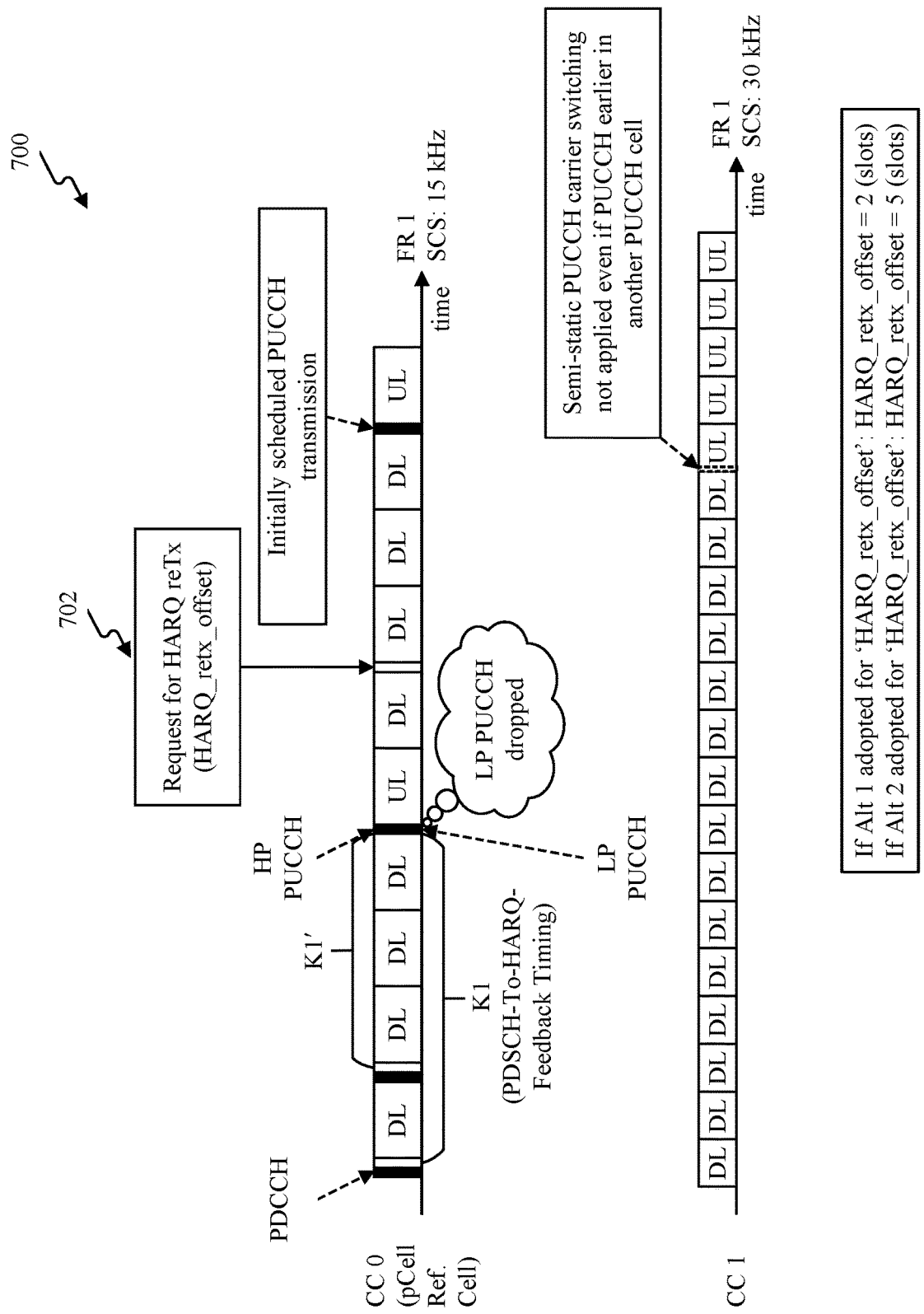
FIG. 7 illustrates an example of a timeline for uplink retransmissions where joint configuration of retransmission and semi-static CC switching is not permitted, or where joint configuration is permitted, but semi-static CC switching is not allowed during retransmission, in accordance with aspects described herein.

FIG. 7 illustrates an example of a timeline 700 for uplink retransmissions where joint configuration of retransmission and semi-static CC switching is not permitted, or where joint configuration is permitted, but semi-static CC switching is not allowed during retransmission. In timeline 700, when HARQ retransmission request 702 is received, the HARQ retransmission offset value in the request can be interpreted based on the numerology of the CC over which the HARQ retransmission request 702 is transmitted (e.g., CC0), so long as there is not a dynamic CC switching occurring during the retransmission. Where a dynamic CC switching is received during retransmission, however, the numerology of the other CC may need to be considered and/or used in interpreting the HARQ retransmission offset value.

In the examples described above, the base station 102 can also refrain from switching the CCs. For example, in method 500, at Block 508, switching from the first CC to the second CC can be refrained from. In an aspect, BS communicating component 342, e.g., in conjunction with processor(s) 312, memory 316, transceiver 302, etc., can refrain from switching from the first CC to the second CC.

In another example, where switching from the first CC to the second CC is permitted and/or allowed during retransmission, in method 400, optionally at Block 410, the second CC can be switched to from the first CC. In an aspect, UE communicating component 242, e.g., in conjunction with processor(s) 212, memory 216, transceiver 202, etc., can switch from the first CC to the second CC during the retransmission procedure (or at least after transmitting the initial uplink transmission and before retransmitting the uplink transmission). For example, UE communicating component 242 can switch from communicating with the base station 102 using the first CC, which can be a reference CC or PCell CC, to communicate with the base station 102 (or another base station or cell) using the second CC. In one example, UE communicating component 242 can receive some signaling on the first CC, such as control signaling. In one example, request receiving component 252 may receive the HARQ retransmission request on the first CC regardless of whether the UE 104 is communicating (e.g., for PDSCH, PUCCH, or PUSCH) using the first CC or second CC.

Similarly, where switching from the first CC to the second CC is permitted and/or allowed during retransmission, in method 500, optionally at Block 510, the second CC can be switched to from the first CC. In an aspect, BS communicating component 342, e.g., in conjunction with processor(s) 312, memory 316, transceiver 302, etc., can switch from the first CC to the second CC during the retransmission procedure (or at least after receiving the initial uplink transmission and before receiving the retransmission of the uplink transmission). For example, BS communicating component 342 can switch from communicating with the UE 104 using the first CC, which can be a reference CC or PCell CC, to communicate with the UE 104 using the second CC. In one example, BS communicating component 342 can transmit some signaling on the first CC, such as control signaling. In one example, requesting component 352 may transmit the HARQ retransmission request on the first CC regardless of whether the base station 102 is communicating with the UE 104 (e.g., for PDSCH, PUCCH, or PUSCH) using the first CC or second CC.

For example, where switching from the first CC to the second CC is permitted and/or allowed during retransmission, in transmitting the retransmission at Block 404, optionally at Block 412, the retransmission can be transmitted, where the retransmission is of the uplink transmission in the slot according to either a first numerology of a first CC or a second numerology of a second CC. In an aspect, retransmitting component 254, e.g., in conjunction with processor(s) 212, memory 216, transceiver 202, UE communicating component 242, etc., can transmit the retransmission, where the retransmission is of the uplink transmission in the slot according to either a first numerology of a first CC or a second numerology of a second CC. In an example, the first CC and the second CC may have different subcarrier spacing (SCS), and as such, the numerologies may be different. Accordingly, retransmitting component 254 can determine whether the HARQ retransmission offset value is to be interpreted based on the first numerology of the first CC or the second numerology of the second CC where communications are switched from the first CC to the second CC before the retransmission (e.g., for semi-static CC switching, dynamic CC switching, and/or the like, as described above).

In one example, where switching from the first CC to the second CC is permitted and/or allowed during retransmission, retransmitting component 254 can interpret the HARQ retransmission offset value based on the first numerology of the first CC, where the first CC can accordingly be considered a reference numerology. For example, the first CC can be the CC over which the HARQ retransmission request is received. In this example, though the CC is switched and retransmitting component 254 can retransmit the uplink transmission on the second CC, retransmitting component 254 can determine the slot of the uplink transmission to be retransmitted based on the numerology of the first CC. In an example, in transmitting the retransmission at Block 404, optionally at Block 414, the slot of the first CC that corresponds to the uplink transmission to be retransmitted can be determined based on the HARQ retransmission offset value and a reference numerology. In an aspect, retransmitting component 254, e.g., in conjunction with processor(s) 212, memory 216, transceiver 202, UE communicating component 242, etc., can determine, based on the HARQ retransmission offset value and the reference numerology, the slot of the first CC that corresponds to the uplink transmission to be retransmitted. An example is shown in FIG. 8.

Figure 8:
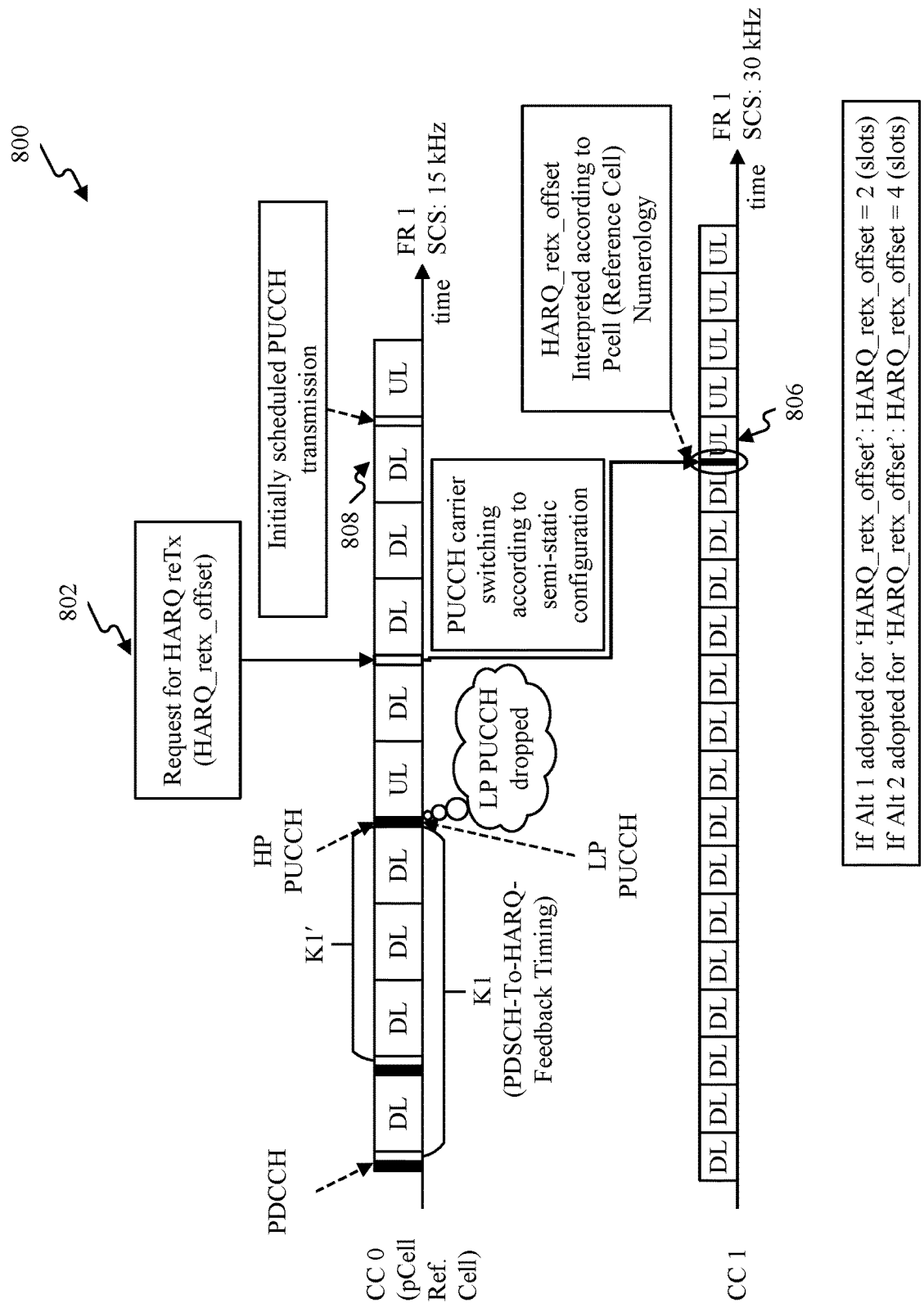
FIG. 8 illustrates an example of a timeline for performing retransmission where CC switching occurs during retransmission, in accordance with aspects described herein.

FIG. 8 illustrates an example of a timeline 800 for performing retransmission where CC switching occurs during retransmission. In timeline 800, HARQ retransmission request 802 can be received along with, or in conjunction with, a command for CC switching from CC0 to CC1. In this example, the HARQ retransmission offset value in the request can be specified and/or interpreted based on the numerology of the CC over which the HARQ retransmission request 802 is transmitted (e.g., CC0). Specifically, in this example, if the HARQ retransmission offset value is Alt 1, which can be indicated as an offset of a number of slots from a current slot within which the HARQ retransmission request is received to the slot that corresponds to the uplink transmission, the HARQ retransmission offset value can be 2 slots on CC0. In another example, if the HARQ retransmission offset value is Alt 2, which can be indicated as an offset of a number of slots from an uplink slot indicated for transmitting the HARQ retransmission to the slot that corresponds to the uplink transmission, the HARQ retransmission offset value can be 4 slots on CC0.

In either case, for example, uplink slot 808 of CC0 can be the uplink slot for HARQ retransmission based on the numerology of CC0, but as CC switching has occurred, UE communicating component 242 can determine the uplink slot 806, and/or transmit a HARQ retransmission in the uplink slot 806, on CC1 that aligns (or otherwise overlaps), in time, with slot 808 of CC0. In this regard, as uplink slot 808 of CC0 can be computed using Alt 1 or Alt 2 above to obtain the slot for HARQ retransmission, the slot is computed or otherwise determined based on the numerology of CC0, and the aligned uplink slot 806, which is 4 slots, on CC1, from the slot that corresponds to the uplink transmission on CC0 according to the numerology of CC0, can be used for transmitting the HARQ retransmission where CC switching has occurred.

In another example, in transmitting the retransmission at Block 404, optionally at Block 416, the slot of the second CC that corresponds to the uplink transmission to be retransmitted can be determined based on the HARQ retransmission offset value and a reference numerology. In an aspect, retransmitting component 254, e.g., in conjunction with processor(s) 212, memory 216, transceiver 202, UE communicating component 242, etc., can determine, based on the HARQ retransmission offset value and the reference numerology, the slot of the second CC that corresponds to the uplink transmission to be retransmitted. An example is shown in FIG. 9.

Figure 9:
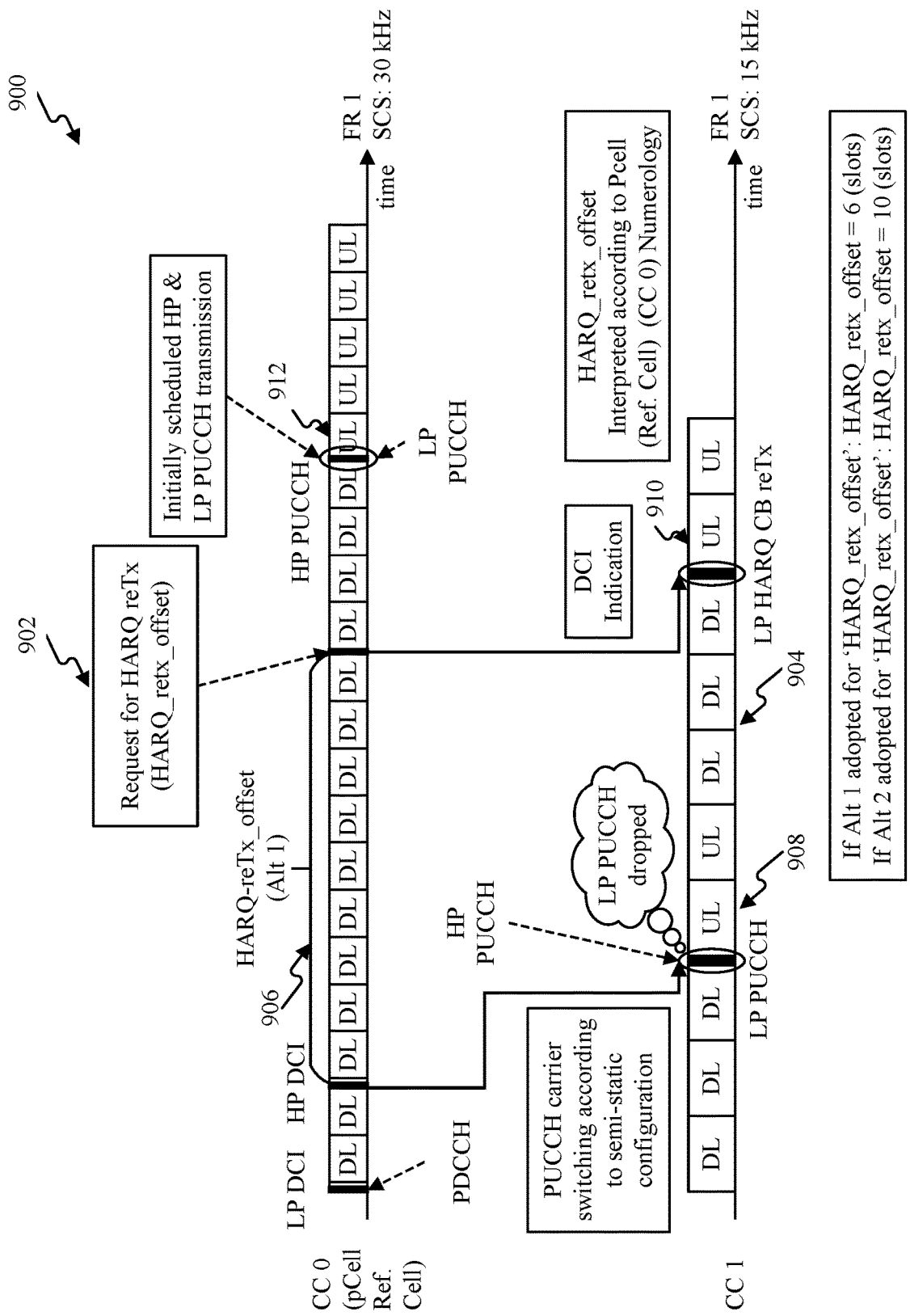
FIG. 9 illustrates an example of a timeline for performing retransmission where CC switching occurs before retransmission, in accordance with aspects described herein.

FIG. 9 illustrates an example of a timeline 900 for performing retransmission where CC switching occurs before retransmission. In timeline 900, the UE can communicate with the base station on CC1, and can receive, on CC0, a HARQ retransmission request 902, for an uplink transmission on CC1. In this example, the HARQ retransmission offset value in the request can be specified and/or interpreted based on the numerology of the CC over which the HARQ retransmission request 902 is transmitted (e.g., CC0). Specifically, in this example, if the HARQ retransmission offset value is Alt 1, which can be indicated as an offset of a number of slots from a current slot within which the HARQ retransmission request is received to the slot that corresponds to the uplink transmission, the HARQ retransmission offset value can be 6 slots on CC0. For example, the HARQ retransmission request 902 can be received in a slot on CC0 that aligns, in time, with slot 904 of CC1. 6 slots back on CC0, according to the CC0 numerology, is slot 906, which aligns, in time, with slot 908 on CC1 over which the uplink transmission was scheduled to be transmitted. Accordingly, UE communicating component 242 can determine the uplink slot 908, and/or transmit a HARQ retransmission in the uplink slot 908 on CC1 based on uplink slot 908 being aligned with, or otherwise overlapping, uplink slot 906 on CC0.

In another example, if the HARQ retransmission offset value is Alt 2, which can be indicated as an offset of a number of slots from an uplink slot indicated for transmitting the HARQ retransmission to the slot that corresponds to the uplink transmission, the HARQ retransmission offset value can be 10 slots on CC0. For example, the uplink slot 910 on CC1 over which the HARQ retransmission can or is to occur can align, in time, with slot 912 of CC0, which is 10 slots, according to the CC0 numerology, from the slot 906 that aligns, in time, to the slot 908 that corresponds to the uplink transmission of CC1. Accordingly, UE communicating component 242 can determine the uplink slot 908, and/or transmit a HARQ retransmission in the uplink slot 908 on CC1 based on uplink slot 908 being aligned with, or otherwise overlapping, uplink slot 906 on CC0.

In an example, where the SCS of the first CC that is the basis for the numerology of interpreting the HARQ retransmission offset value is smaller than the SCS of the second CC to which communications are switched during the retransmission, the HARQ retransmission request may also indicate an index of a slot of multiple slots of the first CC that includes the uplink transmission to be retransmitted. In this example, multiple slots of the smaller SCS of the first CC may align, in time, with the slot of the corresponding slot of the second CC. Thus, when interpreting the HARQ retransmission offset value from the second CC based on the numerology of the first CC, the index may indicate which slot of the multiple slots that align to the slot of the second CC was used to transmit the initial uplink transmission. In this regard, for example, retransmitting component 254 can transmit the retransmission, where the retransmission is of the uplink transmission in the slot according to the first numerology of the first CC and/or based on an index of the slot indicated in the HARQ retransmission request.

In an example, in transmitting the retransmission at Block 404, optionally at Block 418, the slot of the second CC that corresponds to the uplink transmission to be retransmitted can be determined based on the HARQ retransmission offset value and a current numerology. In an aspect, retransmitting component 254, e.g., in conjunction with processor(s) 212, memory 216, transceiver 202, UE communicating component 242, etc., can determine, based on the HARQ retransmission offset value and the current numerology (e.g., of the current CC, which can be the second CC after CC switching), the slot of the second CC that corresponds to the uplink transmission to be retransmitted. An example is shown in FIG. 10.

Figure 10:
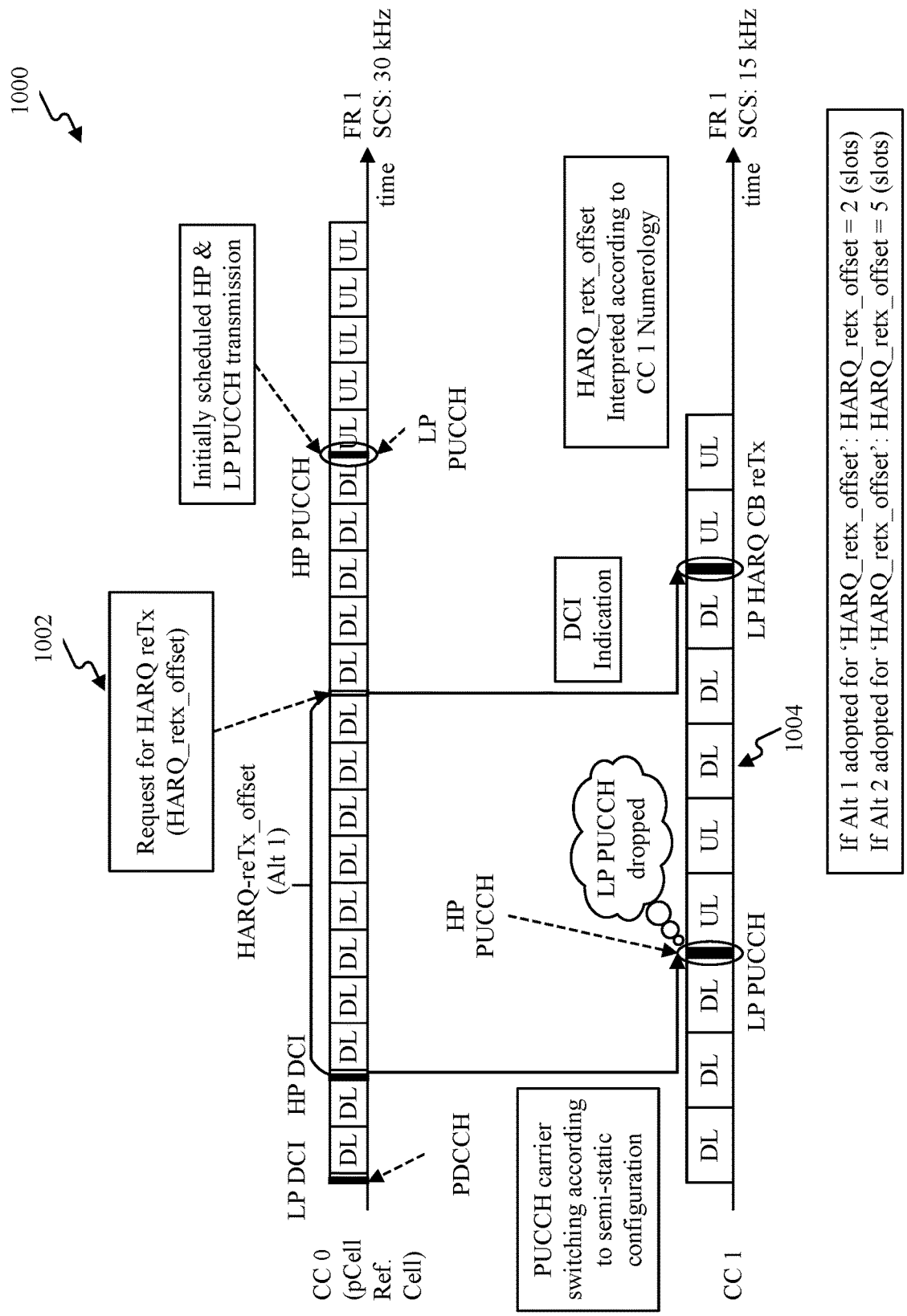
FIG. 10 illustrates an example of a timeline for performing retransmission based on a current CC numerology where CC switching occurs before retransmission, in accordance with aspects described herein.

FIG. 10 illustrates an example of a timeline 1000 for performing retransmission based on a current CC numerology where CC switching occurs before retransmission. In timeline 1000, the UE can communicate with the base station on CC1, and can receive a HARQ retransmission request 1002, for an uplink transmission on CC1, on CC0. In this example, the HARQ retransmission offset value in the request can be specified and/or interpreted based on the numerology of the current CC over which the UE communicates with the base station, which is CC1. Specifically, in this example, if the HARQ retransmission offset value is Alt 1, which can be indicated as an offset of a number of slots from a current slot within which the HARQ retransmission request is received to the slot that corresponds to the uplink transmission, the HARQ retransmission offset value can be 2 slots on CC1. For example, the HARQ retransmission request 1002 can be received in a slot on CC0 that aligns, in time, with slot 1004 of CC1, which is 2 slots ahead of the slot on CC1, and according to the numerology of CC1, over which the uplink transmission was scheduled to be transmitted. In another example, if the HARQ retransmission offset value is Alt 2, which can be indicated as an offset of a number of slots from an uplink slot indicated for transmitting the HARQ retransmission to the slot that corresponds to the uplink transmission, the HARQ retransmission offset value can be 5 slots on CC1. For example, the uplink slot on CC1 over which the HARQ retransmission can or is to occur can be 5 slots, according to the numerology of CC1, from the slot that corresponds to the uplink transmission on CC1.

Similarly, in the above examples, where switching from the first CC to the second CC is permitted and/or allowed during retransmission, in receiving the retransmission at Block 504, optionally at Block 512, the retransmission can be received, where the retransmission is of the uplink transmission in the slot according to either a first numerology of a first CC or a second numerology of a second CC. In an aspect, retransmission receiving component 354, e.g., in conjunction with processor(s) 312, memory 316, transceiver 302, BS communicating component 342, etc., can receive the retransmission, where the retransmission is of the uplink transmission in the slot according to either a first numerology of a first CC or a second numerology of a second CC. In one example, this can include, optionally at Block 514, determining, based on the HARQ retransmission offset value and a reference numerology, the slot of the first CC that corresponds to the uplink transmission to be retransmitted, or at Block 516, determining, based on the HARQ retransmission offset value and a reference numerology, the slot of the second CC that corresponds to the uplink transmission to be retransmitted, as described above with further reference to the examples in FIGS. 8-9. In another example, this can include, optionally at Block 518, determining, based on the HARQ retransmission offset value and a current numerology, the slot of the second CC that corresponds to the uplink transmission to be retransmitted, as described above with further reference to the examples in FIG. 10.

In method 400, optionally at Block 420, an indication of a type of offset to be indicated by the HARQ retransmission offset value can be received. In an aspect, UE communicating component 242, e.g., in conjunction with processor(s) 212, memory 216, transceiver 202, etc., can receive the indication of the type of offset indicated by the HARQ retransmission offset value. For example, UE communicating component 242 can receive the indication from the base station 102 in RRC signaling, media access control (MAC)-control element (CE), DCI, etc. The indication can indicate whether the retransmission offset value received in HARQ retransmission requests are to be interpreted as Alt 1, which can be indicated as an offset of a number of slots from a current slot within which the HARQ retransmission request is received to the slot that corresponds to the uplink transmission, or Alt 2, which can be indicated as an offset of a number of slots from an uplink slot indicated for transmitting the HARQ retransmission to the slot that corresponds to the uplink transmission, as described. Retransmitting component 254 can accordingly determine the uplink transmission to be retransmitted (e.g., or can determine a slot associated with the uplink transmission to be retransmitted) for a given HARQ retransmission request based on the indication.

In method 500, optionally at Block 520, an indication of a type of offset to be indicated by the HARQ retransmission offset value can be transmitted. In an aspect, BS communicating component 342, e.g., in conjunction with processor(s) 312, memory 316, transceiver 302, etc., can transmit the indication of the type of offset indicated by the HARQ retransmission offset value. For example, BS communicating component 342 can transmit the indication from the base station 102 in RRC signaling, MAC-CE, DCI, etc.

In this or an alternative example, in method 400, optionally at Block 422, an indication of a type of offset to be indicated by the HARQ retransmission offset value can be transmitted. In an aspect, UE communicating component 242, e.g., in conjunction with processor(s) 212, memory 216, transceiver 202, etc., can transmit the indication of the type of offset indicated by the HARQ retransmission offset value. For example, UE communicating component 242 can transmit the indication to the base station 102 in a scheduling request (SR) or other transmission. In one example, the base station 102 can confirm the type of offset, which can be received at Block 420.

In method 500, optionally at Block 522, an indication of a type of offset to be indicated by the HARQ retransmission offset value can be received. In an aspect, BS communicating component 342, e.g., in conjunction with processor(s) 312, memory 316, transceiver 302, etc., can receive, e.g., from the UE 104 in a SR, the indication of the type of offset indicated by the HARQ retransmission offset value.

In method 400, optionally at Block 424, an indication of for which one of the first CC or the second CC the HARQ retransmission is configured can be received. In an aspect, UE communicating component 242, e.g., in conjunction with processor(s) 212, memory 216, transceiver 202, etc., can receive the indication of for which one of the first CC or the second CC the HARQ retransmission is configured. For example, where joint configuration of CC carrier switching and triggered HARQ retransmission is possible, HARQ retransmission may be limited to one specific CC (e.g., the reference CC or other CC). In this example, the indication can indicate for which CC the HARQ retransmission can be configured (e.g., the first CC or second CC). In an example, UE communicating component 242 can receive the indication from the base station 102 in RRC signaling, MAC CE, DCI, etc. Retransmitting component 254 can accordingly retransmit the transmission over the indicated CC and/or subject to the numerology determination(s) described above.

In another example, UE communicating component 242 can receive the indication based on implicitly determining for which CC the HARQ retransmission can be configured. For example, UE communicating component 242 can determine one of the first CC or second CC for which HARQ retransmission can be configured based on determining which CC corresponds to a reference cell (e.g., HARQ codeblock (CB) retransmission (reTx) only in Reference Cell), which CC is in a same cell as the CC over which the initial uplink transmission was transmitted (e.g., HARQ CB reTx only in same cell in which initial HARQ CB was cancelled), which CC is after a CC over which the initial uplink transmission was transmitted (e.g., HARQ CB reTx only in first CC after the CC in which initial HARQ CB was cancelled), which CC is in a same cell as a CC over which the DCI triggering HARQ retransmission is received (e.g., HARQ CB reTx only in same cell in which DCI triggering HARQ CB reTx is issued), which CC is after a CC in a same cell as a CC over which the DCI triggering HARQ retransmission is received (e.g., HARQ CB reTx only first CC after the CC in which DCI triggering HARQ CB reTx is issued), which CC is in a cell with a lowest or highest cell identifier (e.g., HARQ CB reTx only in same cell with the lowest or highest ID), which CC is interpreted according to numerology of CC in which the HARQ retransmission is to be transmitted (e.g., HARQ retransmission offset is interpreted according to the numerology of this unique CC in which HARQ CB retransmission is taking place), etc. Retransmitting component 254 can accordingly retransmit the transmission over the implicitly determined CC and/or subject to the numerology determination(s) described above.

In method 500, optionally at Block 524, an indication of a for which one of the first CC or the second CC the HARQ retransmission is configured can be transmitted. In an aspect, BS communicating component 342, e.g., in conjunction with processor(s) 312, memory 316, transceiver 302, etc., can transmit the indication of for which one of the first CC or the second CC the HARQ retransmission is configured.

For example, BS communicating component 342 can transmit the indication from the base station 102 in RRC signaling, MAC-CE, DCI, etc.

Figure 11:
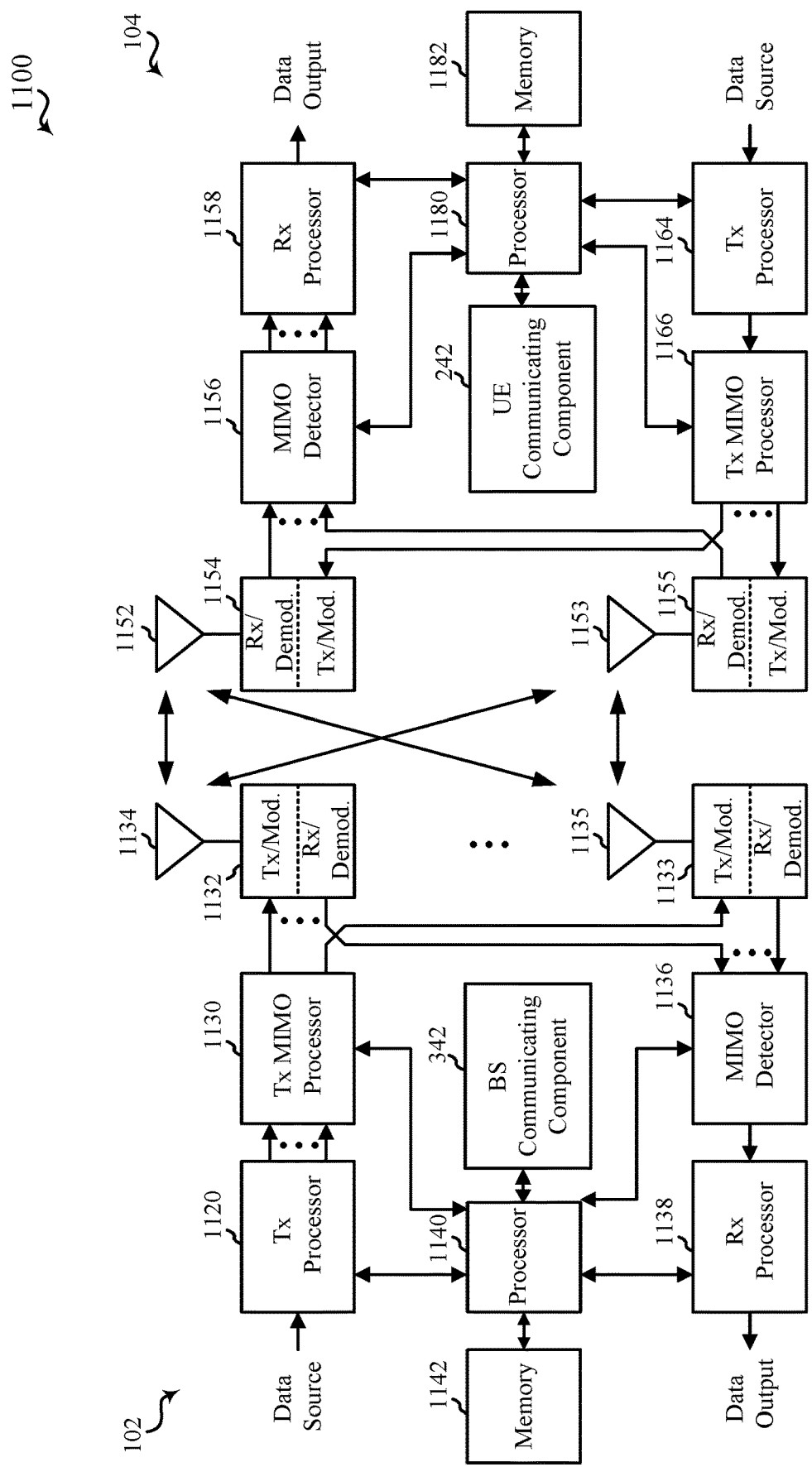
FIG. 11 is a block diagram illustrating an example of a multiple-input multiple-output (MIMO) communication system including a base station and a UE, in accordance with various aspects of the present disclosure.

FIG. 11 is a block diagram of a MIMO communication system 1100 including a base station 102 and a UE 104. The MIMO communication system 1100 may illustrate aspects of the wireless communication access network 100 described with reference to FIG. 1. The base station 102 may be an example of aspects of the base station 102 described with reference to FIG. 1. The base station 102 may be equipped with antennas 1134 and 1135, and the UE 104 may be equipped with antennas 1152 and 1153. In the MIMO communication system 1100, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1120 may receive data from a data source. The transmit processor 1120 may process the data. The transmit processor 1120 may also generate control symbols or reference symbols. A transmit MIMO processor 1130 may perform spatial processing (e.g., precoding) on data symbols, control symbols, or reference symbols, if applicable, and may provide output symbol streams to the transmit modulator/demodulators 1132 and 1133. Each modulator/demodulator 1132 through 1133 may process a respective output symbol stream (e.g., for OFDM, etc.) to obtain an output sample stream. Each modulator/demodulator 1132 through 1133 may further process (e.g., convert to analog, amplify, filter, and upconvert) the output sample stream to obtain a DL signal. In one example, DL signals from modulator/demodulators 1132 and 1133 may be transmitted via the antennas 1134 and 1135, respectively.

The UE 104 may be an example of aspects of the UEs 104 described with reference to FIGS. 1-2. At the UE 104, the UE antennas 1152 and 1153 may receive the DL signals from the base station 102 and may provide the received signals to the modulator/demodulators 1154 and 1155, respectively. Each modulator/demodulator 1154 through 1155 may condition (e.g., filter, amplify, downconvert, and digitize) a respective received signal to obtain input samples. Each modulator/demodulator 1154 through 1155 may further process the input samples (e.g., for OFDM, etc.) to obtain received symbols. A MIMO detector 1156 may obtain received symbols from the modulator/demodulators 1154 and 1155, perform MIMO detection on the received symbols, if applicable, and provide detected symbols. A receive (Rx) processor 1158 may process (e.g., demodulate, deinterleave, and decode) the detected symbols, providing decoded data for the UE 104 to a data output, and provide decoded control information to a processor 1180, or memory 1182.

The processor 1180 may in some cases execute stored instructions to instantiate a UE communicating component 242 (see e.g., FIGS. 1 and 2).

On the uplink (UL), at the UE 104, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulator/demodulators 1154 and 1155 (e.g., for SC-FDMA, etc.), and be transmitted to the base station 102 in accordance with the communication parameters received from the base station 102. At the base station 102, the UL signals from the UE 104 may be received by the antennas 1134 and 1135, processed by the modulator/demodulators 1132 and 1133, detected by a MIMO detector 1136 if applicable, and further processed by a receive processor 1138. The receive processor 1138 may provide decoded data to a data output and to the processor 1140 or memory 1142.

The processor 1140 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1100. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1100.

The following aspects are illustrative only and aspects thereof may be combined with aspects of other embodiments or teaching described herein, without limitation.

Aspect 1 is a method for wireless communications at a UE including receiving, from a base station, a HARQ retransmission request including a HARQ retransmission offset value indicating a slot of an uplink transmission to be retransmitted, where the HARQ retransmission offset value indicates, based at least in part on whether switching CCs is permitted, the slot according to either a first numerology of a first CC or a second numerology of a second CC, and transmitting, to the base station based on the HARQ retransmission offset value, a retransmission of the uplink transmission in the slot.

In Aspect 2, the method of Aspect 1 includes where joint configuration of HARQ retransmission and switching CCs is not permitted, and the retransmission offset value indicates the slot according to the first numerology of the first CC.

In Aspect 3, the method of any of Aspects 1 or 2 includes where joint configuration of HARQ retransmission and semi-static switching CCs is not permitted, and dynamic switching of CCs does not occur before transmitting the retransmission of the uplink transmission, and the retransmission offset value indicates the slot according to the first numerology of the first CC.

In Aspect 4, the method of any of Aspects 1 to 3 includes receiving, from the base station, a dynamic command to switch from the first CC to the second CC, where joint configuration of HARQ retransmission and semi-static switching CCs is not permitted, and switching from the first CC to the second CC for communicating with the base station, where transmitting the retransmission includes transmitting, to the base station, the retransmission of the uplink transmission over the second CC, and the retransmission offset value indicates the slot according to the first numerology of the first CC.

In Aspect 5, the method of any of Aspects 1 to 4 includes where joint configuration of HARQ retransmission and switching CCs is permitted, and including refraining from switching from the first CC to the second CC where a command to switch from the first CC to the second CC is received from the base station.

In Aspect 6, the method of any of Aspects 1 to 5 includes where joint configuration of HARQ retransmission and semi-static switching CCs is permitted, and including switching from the first CC to the second CC where a dynamic command to switch from the first CC to the second CC is received from the base station.

In Aspect 7, the method of any of Aspects 1 to 7 includes switching from the first CC to the second CC for communicating with the base station, where the HARQ retransmission offset value indicates the slot according to the first numerology of the first CC as a reference numerology.

In Aspect 8, the method of Aspect 7 includes determining, based on the HARQ retransmission offset value and the reference numerology, the slot of the first CC that corresponds to the uplink transmission to be retransmitted.

In Aspect 9, the method of Aspect 8 includes where the HARQ retransmission request is received on the first CC, where the HARQ retransmission offset value indicates, according to the reference numerology, an offset of a number of slots on the first CC from a current slot within which the HARQ retransmission request is received to the slot of the first CC that corresponds to the uplink transmission.

In Aspect 10, the method of Aspect 8 includes where the HARQ retransmission request is received on the first CC, where the HARQ retransmission offset value indicates, according to the reference numerology, an offset of a number of slots on the first CC from an aligned slot that aligns, in time, with an uplink slot indicated for transmitting the retransmission on the second CC to the slot of the first CC that corresponds to the uplink transmission.

In Aspect 11, the method of Aspect 10 includes where the HARQ retransmission request further indicates an index of the slot within a number of slots on the first CC that are aligned, in time, with the next uplink slot on the second CC.

In Aspect 12, the method of Aspect 7 includes determining, based on the HARQ retransmission offset value and the reference numerology, the slot of the second CC that corresponds to the uplink transmission to be retransmitted.

In Aspect 13, the method of Aspect 12 includes where the HARQ retransmission request is received on the second CC, where the HARQ retransmission offset value indicates, according to the reference numerology, an offset of a number of slots on the second CC from a current slot within which the HARQ retransmission request is received to the slot of the second CC that corresponds to the uplink transmission.

In Aspect 14, the method of Aspect 13 includes where the HARQ retransmission request is received on the second CC, where the HARQ retransmission offset value indicates, according to the reference numerology, an offset of a number of slots on the second CC from an uplink slot indicated for transmitting the retransmission on the second CC to the slot of the second CC that corresponds to the uplink transmission.

In Aspect 15, the method of Aspect 14 includes where the HARQ retransmission request further indicates an index of the slot within a number of slots on the first CC that are aligned, in time, with the next uplink slot on the second CC.

In Aspect 16, the method of any of Aspects 1 to 15 includes where the HARQ retransmission offset value indicates the slot according to the second numerology of the second CC as a current numerology.

In Aspect 17, the method of Aspect 16 includes where the HARQ retransmission request is received on the second CC, where the HARQ retransmission offset value indicates, according to the current numerology, an offset of a number of slots on the second CC from a current slot within which the HARQ retransmission request is received to the slot of the second CC that corresponds to the uplink transmission.

In Aspect 18, the method of Aspect 16 includes where the HARQ retransmission request is received on the second CC, where the HARQ retransmission offset value indicates, according to the current numerology, an offset of a number of slots on the second CC from an uplink slot indicated for transmitting the retransmission on the second CC to the slot of the second CC that corresponds to the uplink transmission.

In Aspect 19, the method of any of Aspects 1 to 18 includes receiving, in DCI or MAC CE from the base station, an indication of whether the HARQ retransmission offset value indicates, an offset of a number of slots from a current slot within which the HARQ retransmission request is received to the slot of the uplink transmission, or an offset of a number of slots from a next uplink slot to the slot of the uplink transmission.

In Aspect 20, the method of any of Aspects 1 to 19 includes transmitting, to the base station, a request that the HARQ retransmission offset value indicates an offset of a number of slots from a current slot within which the HARQ retransmission request is received to the slot of the uplink transmission, or an offset of a number of slots from a next uplink slot to the slot of the uplink transmission.

In Aspect 21, the method of any of Aspects 1 to 20 includes where joint configuration of HARQ retransmission and semi-static switching CCs is permitted, and including determining for which one of the first CC or the second CC the HARQ retransmission is configured.

In Aspect 22, the method of Aspect 21 includes where determining for which one of the first CC or the second CC the HARQ retransmission is configured is based on receiving, from the base station, an indication indicating for which one of the first CC or the second CC the HARQ retransmission is configured.

In Aspect 23, the method of Aspect 22 includes receiving the indication in one or more of RRC signaling, a MAC CE, or a DCI.

In Aspect 24, the method of any of Aspects 21 to 23 includes where determining for which one of the first CC or the second CC the HARQ retransmission is configured includes determining one of the first CC or the second CC as associated with a reference cell, as associated with a cell in which the uplink transmission was transmitted, as not associated with the cell in which the uplink transmission was transmitted, as associated with a cell in which a DCI triggering the HARQ retransmission is received, as associated with a CC over which the DCI triggering the HARQ retransmission is received, or as associated with a cell having a lowest or highest cell identifier.

In Aspect 25, the method of any of Aspects 21 to 24 includes where the HARQ retransmission offset value indicates the slot according to either the first numerology of the first CC or the second numerology of a second CC for which the HARQ retransmission is configured.

In Aspect 26, the method of any of Aspects 1 to 25 includes where the HARQ retransmission offset value indicates the slot according to either the first numerology of the first CC or the second numerology of a second CC based on which of the first CC or the second CC has a highest subcarrier spacing.

In Aspect 27, the method of any of Aspects 1 to 26 includes where the HARQ retransmission offset value indicates the slot according to either the first numerology of the first CC or the second numerology of a second CC based on which of the first CC or the second CC has a lowest or highest CC index.

Aspect 28 is a method for wireless communications at a base station including transmitting, to a UE, a HARQ retransmission request including a HARQ retransmission offset value indicating a slot of an uplink transmission to be retransmitted includes where the HARQ retransmission offset value indicates, based at least in part on whether switching CCs is permitted, the slot according to either a first numerology of a first CC or a second numerology of a second CC, and receiving, from the UE based on the HARQ retransmission request, a retransmission of the uplink transmission in the slot.

In Aspect 29, the method of Aspect 28 includes where joint configuration of HARQ retransmission and switching CCs is not permitted, and the retransmission offset value indicates the slot according to the first numerology of the first CC.

In Aspect 30, the method of any of Aspects 28 or 29 includes where joint configuration of HARQ retransmission and semi-static switching CCs is not permitted, and dynamic switching of CCs does not occur before transmitting the retransmission of the uplink transmission, and the retransmission offset value indicates the slot according to the first numerology of the first CC.

In Aspect 31, the method of any of Aspects 28 to 30 includes transmitting, to the UE, a dynamic command to switch from the first CC to the second CC, where joint configuration of HARQ retransmission and semi-static switching CCs is not permitted, and switching from the first CC to the second CC for communicating with the UE, where receiving the retransmission includes receiving, from the UE, the retransmission of the uplink transmission over the second CC, and the retransmission offset value indicates the slot according to the first numerology of the first CC.

In Aspect 32, the method of any of Aspects 28 to 31 includes where joint configuration of HARQ retransmission and switching CCs is permitted, and including refraining from switching from the first CC to the second CC where a command to switch from the first CC to the second CC transmitted to the UE.

In Aspect 33, the method of any of Aspects 28 to 32 includes where joint configuration of HARQ retransmission and semi-static switching CCs is permitted, and including switching from the first CC to the second CC where a dynamic command to switch from the first CC to the second CC is transmitted to the UE.

In Aspect 34, the method of any of Aspects 28 to 33 includes switching from the first CC to the second CC for communicating with the UE, where the HARQ retransmission offset value indicates the slot according to the first numerology of the first CC as a reference numerology.

In Aspect 35, the method of Aspect 34 includes determining, based on the HARQ retransmission offset value and the reference numerology, the slot of the first CC that corresponds to the uplink transmission to be retransmitted.

In Aspect 36, the method of Aspect 35 includes where the HARQ retransmission request is transmitted on the first CC, where the HARQ retransmission offset value indicates, according to the reference numerology, an offset of a number of slots on the first CC from a current slot within which the HARQ retransmission request is transmitted to the slot of the first CC that corresponds to the uplink transmission.

In Aspect 37, the method of Aspect 35 includes where the HARQ retransmission request is transmitted on the first CC, where the HARQ retransmission offset value indicates, according to the reference numerology, an offset of a number of slots on the first CC from an aligned slot that aligns, in time, with an uplink slot indicated for transmitting the retransmission on the second CC to the slot of the first CC that corresponds to the uplink transmission.

In Aspect 38, the method of Aspect 37 includes where the HARQ retransmission request further indicates an index of the slot within a number of slots on the first CC that are aligned, in time, with the next uplink slot on the second CC.

In Aspect 39, the method of Aspect 34 includes determining, based on the HARQ retransmission offset value and the reference numerology, the slot of the second CC that corresponds to the uplink transmission to be retransmitted.

In Aspect 40, the method of Aspect 39 includes where the HARQ retransmission request is transmitted on the second CC, where the HARQ retransmission offset value indicates, according to the reference numerology, an offset of a number of slots on the second CC from a current slot within which the HARQ retransmission request is transmitted to the slot of the second CC that corresponds to the uplink transmission.

In Aspect 41, the method of Aspect 40 includes where the HARQ retransmission request is transmitted on the second CC, where the HARQ retransmission offset value indicates, according to the reference numerology, an offset of a number of slots on the second CC from an uplink slot indicated for transmitting the retransmission on the second CC to the slot of the second CC that corresponds to the uplink transmission.

In Aspect 42, the method of Aspect 41 includes where the HARQ retransmission request further indicates an index of the slot within a number of slots on the first CC that are aligned, in time, with the next uplink slot on the second CC.

In Aspect 43, the method of any of Aspects 28 to 42 includes where the HARQ retransmission offset value indicates the slot according to the second numerology of the second CC as a current numerology.

In Aspect 44, the method of Aspect 43 includes where the HARQ retransmission request is transmitted on the second CC, where the HARQ retransmission offset value indicates, according to the current numerology, an offset of a number of slots on the second CC from a current slot within which the HARQ retransmission request is transmitted to the slot of the second CC that corresponds to the uplink transmission.

In Aspect 45, the method of Aspect 43 includes where the HARQ retransmission request is transmitted on the second CC, where the HARQ retransmission offset value indicates, according to the current numerology, an offset of a number of slots on the second CC from an uplink slot indicated for transmitting the retransmission on the second CC to the slot of the second CC that corresponds to the uplink transmission.

In Aspect 46, the method of any of Aspects 28 to 45 includes transmitting, in DCI or MAC CE to the UE, an indication of whether the HARQ retransmission offset value indicates an offset of a number of slots from a current slot within which the HARQ retransmission request is transmitted to the slot of the uplink transmission, or an offset of a number of slots from a next uplink slot to the slot of the uplink transmission.

In Aspect 47, the method of any of Aspects 28 to 46 includes receiving, from the UE, a request that the HARQ retransmission offset value indicates an offset of a number of slots from a current slot within which the HARQ retransmission request is transmitted to the slot of the uplink transmission, or an offset of a number of slots from a next uplink slot to the slot of the uplink transmission.

In Aspect 48, the method of any of Aspects 28 to 47 includes where joint configuration of HARQ retransmission and semi-static switching CCs is permitted, and including determining for which one of the first CC or the second CC the HARQ retransmission is configured.

In Aspect 49, the method of Aspect 48 includes where determining for which one of the first CC or the second CC the HARQ retransmission is configured is based on transmitting, to the UE, an indication indicating for which one of the first CC or the second CC the HARQ retransmission is configured.

In Aspect 50, the method of Aspect 49 includes transmitting the indication in one or more of radio resource control (RRC) signaling, a media access control (MAC) control element (CE), or a downlink control information (DCI).

In Aspect 51, the method of Aspect 48 includes where determining for which one of the first CC or the second CC the HARQ retransmission is configured includes determining one of the first CC or the second CC as associated with a reference cell, as associated with a cell in which the uplink transmission was transmitted, as not associated with the cell in which the uplink transmission was transmitted, as associated with a cell in which a downlink control information (DCI) triggering the HARQ retransmission is received, as associated with a CC over which the DCI triggering the HARQ retransmission is received, or as associated with a cell having a lowest or highest cell identifier.

In Aspect 52, the method of Aspect 48 includes where the HARQ retransmission offset value indicates the slot according to either the first numerology of the first CC or the second numerology of a second CC for which the HARQ retransmission is configured.

In Aspect 53, the method of any of Aspects 28 to 52 includes where the HARQ retransmission offset value indicates the slot according to either the first numerology of the first CC or the second numerology of a second CC based on which of the first CC or the second CC has a highest subcarrier spacing.

In Aspect 54, the method of any of Aspects 28 to 53 includes where the HARQ retransmission offset value indicates the slot according to either the first numerology of the first CC or the second numerology of a second CC based on which of the first CC or the second CC has a lowest or highest CC index.

Aspect 55 is an apparatus for wireless communication including a transceiver, a memory configured to store instructions, and one or more processors communicatively coupled with the memory and the transceiver, where the one or more processors are configured to execute the instructions to cause the apparatus to perform any of the methods of Aspects 1 to 54.

Aspect 56 is an apparatus for wireless communication including means for performing any of the methods of Aspects 1 to 54.

Aspect 57 is a computer-readable medium including code executable by one or more processors for wireless communications, the code including code for performing any of the methods of Aspects 1 to 54.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a processor;
memory coupled with the processor; and
instructions stored in the memory and operable, when executed by the processor, to cause the apparatus to:
receive, from a base station, a hybrid automatic repeat request (HARQ) retransmission request including a HARQ retransmission offset value indicating a slot of an uplink transmission to be retransmitted, wherein the HARQ retransmission offset value indicates, based at least in part on whether switching component carriers (CCs) is permitted, the slot according to either a first numerology of a first CC or a second numerology of a second CC; and
transmit, to the base station based on the HARQ retransmission offset value, a retransmission of the uplink transmission in the slot.

2. The apparatus of claim 1, wherein the instructions, when executed by the processor, cause the apparatus to switch from the first CC to the second CC for communicating with the base station, wherein the HARQ retransmission offset value indicates the slot according to the first numerology of the first CC as a reference numerology.

3. The apparatus of claim 2, wherein the instructions, when executed by the processor, cause the apparatus to determine, based on the HARQ retransmission offset value and the reference numerology, the slot of the first CC that corresponds to the uplink transmission to be retransmitted.

4. The apparatus of claim 3, wherein the HARQ retransmission request is received on the first CC, wherein the HARQ retransmission offset value indicates, according to the reference numerology, an offset of a number of slots on the first CC from a current slot within which the HARQ retransmission request is received to the slot of the first CC that corresponds to the uplink transmission.

5. The apparatus of claim 3, wherein the HARQ retransmission request is received on the first CC, wherein the HARQ retransmission offset value indicates, according to the reference numerology, an offset of a number of slots on the first CC from an aligned slot that aligns, in time, with an uplink slot indicated for transmitting the retransmission on the second CC to the slot of the first CC that corresponds to the uplink transmission.

6. The apparatus of claim 5, wherein the HARQ retransmission request further indicates an index of the slot within a number of slots on the first CC that are aligned, in time, with a next uplink slot on the second CC.

7. The apparatus of claim 2, wherein the instructions, when executed by the processor, cause the apparatus to determine, based on the HARQ retransmission offset value and the reference numerology, the slot of the second CC that corresponds to the uplink transmission to be retransmitted.

8. The apparatus of claim 7, wherein the HARQ retransmission request is received on the second CC, wherein the HARQ retransmission offset value indicates, according to the reference numerology, an offset of a number of slots on the second CC from a current slot within which the HARQ retransmission request is received to the slot of the second CC that corresponds to the uplink transmission.

9. The apparatus of claim 7, wherein the HARQ retransmission request is received on the second CC, wherein the HARQ retransmission offset value indicates, according to the reference numerology, an offset of a number of slots on the second CC from an uplink slot indicated for transmitting the retransmission on the second CC to the slot of the second CC that corresponds to the uplink transmission.

10. The apparatus of claim 9, wherein the HARQ retransmission request further indicates an index of the slot within a number of slots on the first CC that are aligned, in time, with a next uplink slot on the second CC.

11. The apparatus of claim 1, wherein joint configuration of HARQ retransmission and semi-static switching CCs is permitted, and wherein the instructions, when executed by the processor, cause the apparatus to switch from the first CC to the second CC where a dynamic command to switch from the first CC to the second CC is received from the base station.

12. The apparatus of claim 1, wherein the instructions, when executed by the processor, cause the apparatus to receive, in downlink control information (DCI) or media access control (MAC) control element (CE) from the base station, an indication of whether the HARQ retransmission offset value indicates:
an offset of a number of slots from a current slot within which the HARQ retransmission request is received to the slot of the uplink transmission; or
an offset of a number of slots from a next uplink slot to the slot of the uplink transmission.

13. The apparatus of claim 1, wherein the instructions, when executed by the processor, cause the apparatus to transmit, to the base station, a request that the HARQ retransmission offset value indicates:
an offset of a number of slots from a current slot within which the HARQ retransmission request is received to the slot of the uplink transmission; or
an offset of a number of slots from a next uplink slot to the slot of the uplink transmission.

14. The apparatus of claim 1, wherein joint configuration of HARQ retransmission and semi-static switching CCs is permitted, and wherein the instructions, when executed by the processor, cause the apparatus to determine for which one of the first CC or the second CC the HARQ retransmission is configured.

15. The apparatus of claim 14, wherein the instructions, when executed by the processor, cause the apparatus to determine for which one of the first CC or the second CC the HARQ retransmission is configured based on receiving, from the base station in one or more of radio resource control (RRC) signaling, a media access control (MAC) control element (CE), or a downlink control information (DCI), an indication indicating for which one of the first CC or the second CC the HARQ retransmission is configured.

16. The apparatus of claim 15, wherein the instructions, when executed by the processor, cause the apparatus to determine for which one of the first CC or the second CC the HARQ retransmission is configured at least in part by determining one of the first CC or the second CC as associated with a reference cell, as associated with a cell in which the uplink transmission was transmitted, as not associated with the cell in which the uplink transmission was transmitted, as associated with a cell in which a triggering DCI triggering the HARQ retransmission is received, as associated with a CC over which the triggering DCI is received, or as associated with a cell having a lowest or highest cell identifier.

17. An apparatus for wireless communication, comprising:
a processor;
memory coupled with the processor; and
instructions stored in the memory and operable, when executed by the processor, to cause the apparatus to:
transmit, to a user equipment (UE), a hybrid automatic repeat request (HARQ) retransmission request including a HARQ retransmission offset value indicating a slot of an uplink transmission to be retransmitted, wherein the HARQ retransmission offset value indicates, based at least in part on whether switching component carriers (CCs) is permitted, the slot according to either a first numerology of a first CC or a second numerology of a second CC; and
receive, from the UE based on the HARQ retransmission request, a retransmission of the uplink transmission in the slot.

18. The apparatus of claim 17, wherein the instructions, when executed by the processor, cause the apparatus to switch from the first CC to the second CC for communicating with the UE, wherein the HARQ retransmission offset value indicates the slot according to the first numerology of the first CC as a reference numerology.

19. The apparatus of claim 18, wherein the instructions, when executed by the processor, cause the apparatus to determine, based on the HARQ retransmission offset value and the reference numerology, the slot of the first CC that corresponds to the uplink transmission to be retransmitted.

20. The apparatus of claim 19, wherein the HARQ retransmission request is transmitted on the first CC, wherein the HARQ retransmission offset value indicates, according to the reference numerology, an offset of a number of slots on the first CC from a current slot within which the HARQ retransmission request is transmitted to the slot of the first CC that corresponds to the uplink transmission.

21. The apparatus of claim 19, wherein the HARQ retransmission request is transmitted on the first CC, wherein the HARQ retransmission offset value indicates, according to the reference numerology, an offset of a number of slots on the first CC from an aligned slot that aligns, in time, with an uplink slot indicated for transmitting the retransmission on the second CC to the slot of the first CC that corresponds to the uplink transmission.

22. The apparatus of claim 21, wherein the HARQ retransmission request further indicates an index of the slot within a number of slots on the first CC that are aligned, in time, with a next uplink slot on the second CC.

23. The apparatus of claim 18, wherein the instructions, when executed by the processor, cause the apparatus to determine, based on the HARQ retransmission offset value and the reference numerology, the slot of the second CC that corresponds to the uplink transmission to be retransmitted.

24. The apparatus of claim 23, wherein the HARQ retransmission request is transmitted on the second CC, wherein the HARQ retransmission offset value indicates, according to the reference numerology, an offset of a number of slots on the second CC from a current slot within which the HARQ retransmission request is transmitted to the slot of the second CC that corresponds to the uplink transmission.

25. The apparatus of claim 24, wherein the HARQ retransmission request is transmitted on the second CC, wherein the HARQ retransmission offset value indicates, according to the reference numerology, an offset of a number of slots on the second CC from an uplink slot indicated for transmitting the retransmission on the second CC to the slot of the second CC that corresponds to the uplink transmission.

26. The apparatus of claim 25, wherein the HARQ retransmission request further indicates an index of the slot within a number of slots on the first CC that are aligned, in time, with a next uplink slot on the second CC.

27. The apparatus of claim 17, wherein joint configuration of HARQ retransmission and semi-static switching CCs is permitted, and wherein the instructions, when executed by the processor, cause the apparatus to switch from the first CC to the second CC where a dynamic command to switch from the first CC to the second CC is transmitted to the UE.

28. A method for wireless communications at a user equipment (UE), comprising:

receiving, from a base station, a hybrid automatic repeat request (HARQ) retransmission request including a HARQ retransmission offset value indicating a slot of an uplink transmission to be retransmitted, wherein the HARQ retransmission offset value indicates, based at least in part on whether switching component carriers (CCs) is permitted, the slot according to either a first numerology of a first CC or a second numerology of a second CC; and transmitting, to the base station based on the HARQ retransmission offset value, a retransmission of the uplink transmission in the slot.

29. The method of claim 28, further comprising switching from the first CC to the second CC for communicating with the base station, wherein the HARQ retransmission offset value indicates the slot according to the first numerology of the first CC as a reference numerology.

30. A method for wireless communications at a base station, comprising:

transmitting, to a user equipment (UE), a hybrid automatic repeat request (HARQ) retransmission request including a HARQ retransmission offset value indicating a slot of an uplink transmission to be retransmitted, wherein the HARQ retransmission offset value indicates, based at least in part on whether switching component carriers (CCs) is permitted, the slot according to either a first numerology of a first CC or a second numerology of a second CC; and receiving, from the UE based on the HARQ retransmission request, a retransmission of the uplink transmission in the slot.

\* \* \* \* \*